Figure 1:
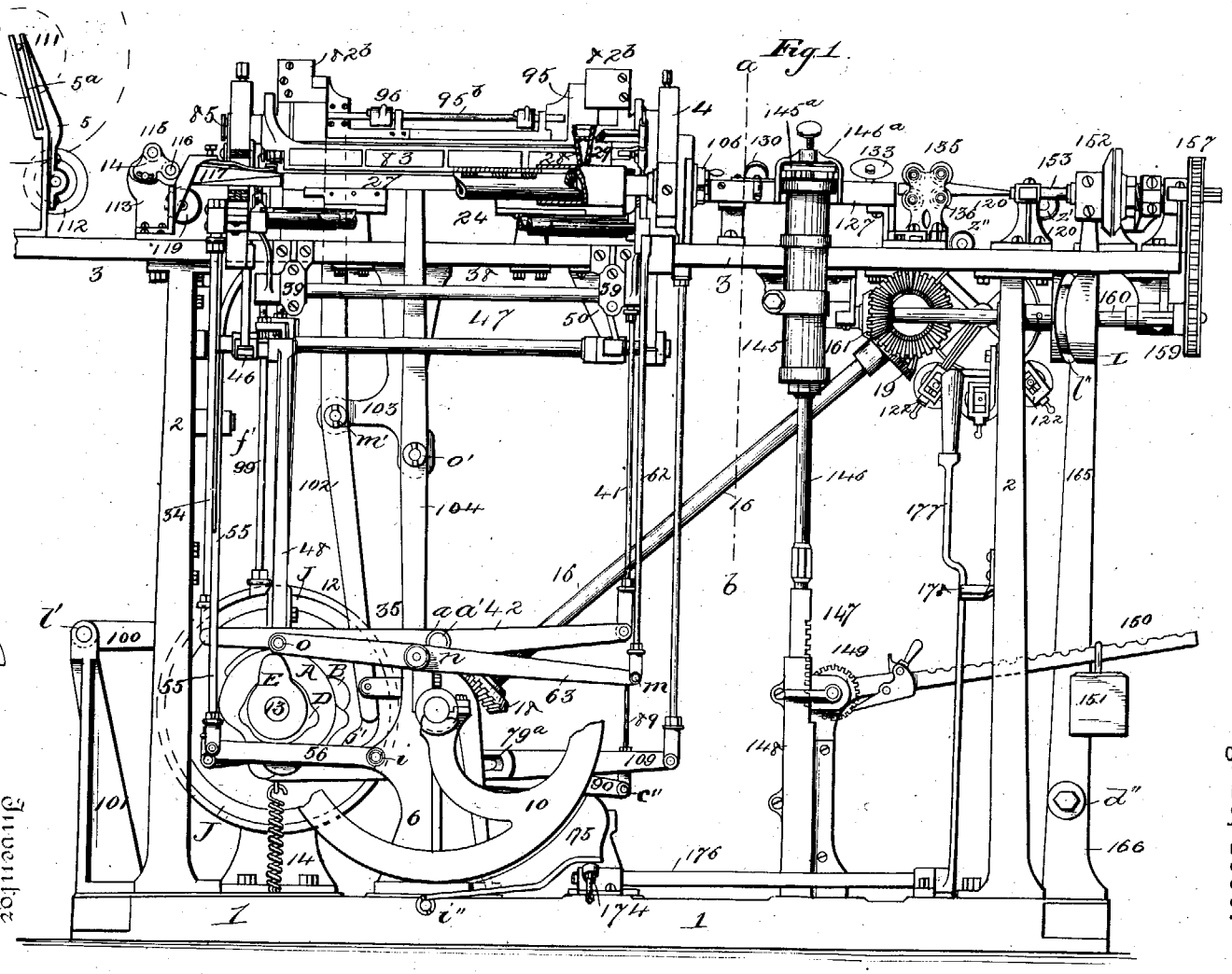

22 Sheets—Sheet 1.

R. HARDIE.

Assignor to H. C. Elliot.

CIGARETTE MACHINE.

No. 11,104. Reissued Aug. 19, 1890.

Witnesses
Edw. A. Muir
H. W. Elliott

Inventor
Robert Hardie
By Foster & Freeman
Attorneys

22 Sheets—Sheet 2.

R. HARDIE.

Assignor to H. C. ELLIOT.

CIGARETTE MACHINE.

No. 11,104. Reissued Aug. 19, 1890.

Witnesses
Edw. A. Muir
H. W. Shmoll

Inventor Robert Hardie
By Foster & Freeman
Attorneys

22 Sheets—Sheet 3.

R. HARDIE.

Assignor to H. C. ELLIOT.

CIGARETTE MACHINE.

No. 11,104. Reissued Aug. 19, 1890.

WITNESSES
Edw. A. Muir
H. W. Elmore

Inventor
Robert Hardie
By Robert Freeman
Attorneys

22 Sheets—Sheet 4.
R. HARDIE.
Assignor to H. C. ELLIOT.
CIGARETTE MACHINE.
No. 11,104. Reissued Aug. 19, 1890.
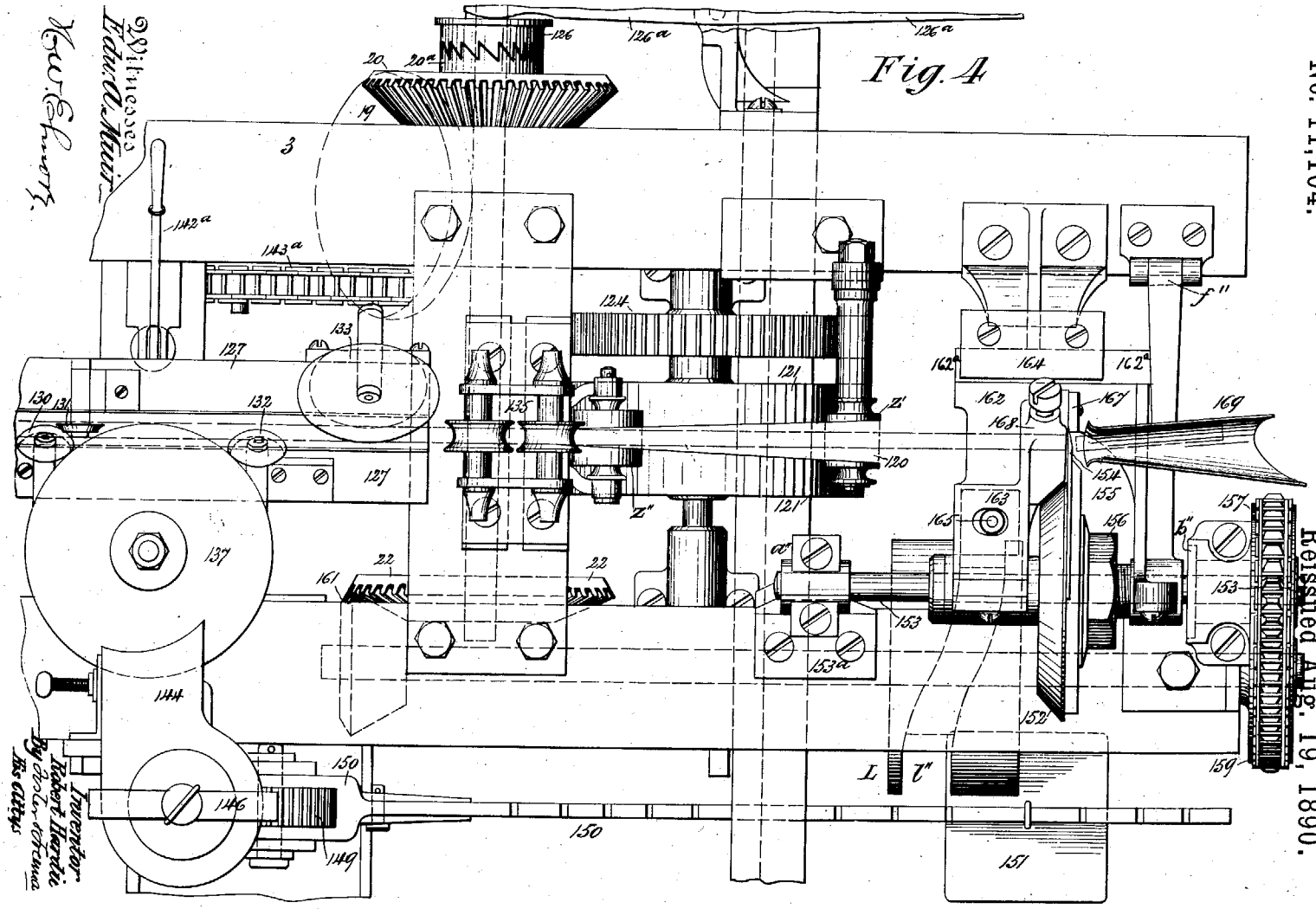

R. HARDIE.

Assignor to H. C. ELLIOT.

CIGARETTE MACHINE.

No. 11,104. Reissued Aug. 19, 1890.

Witnesses
Edw. A. Muir
Geo. Elliott.

Inventor
Robert Hardie
By Peter C. Freeman
Attorney

R. HARDIE.
Assignor to H. C. ELLIOT.
CIGARETTE MACHINE.
No. 11,104. Reissued Aug. 19, 1890.
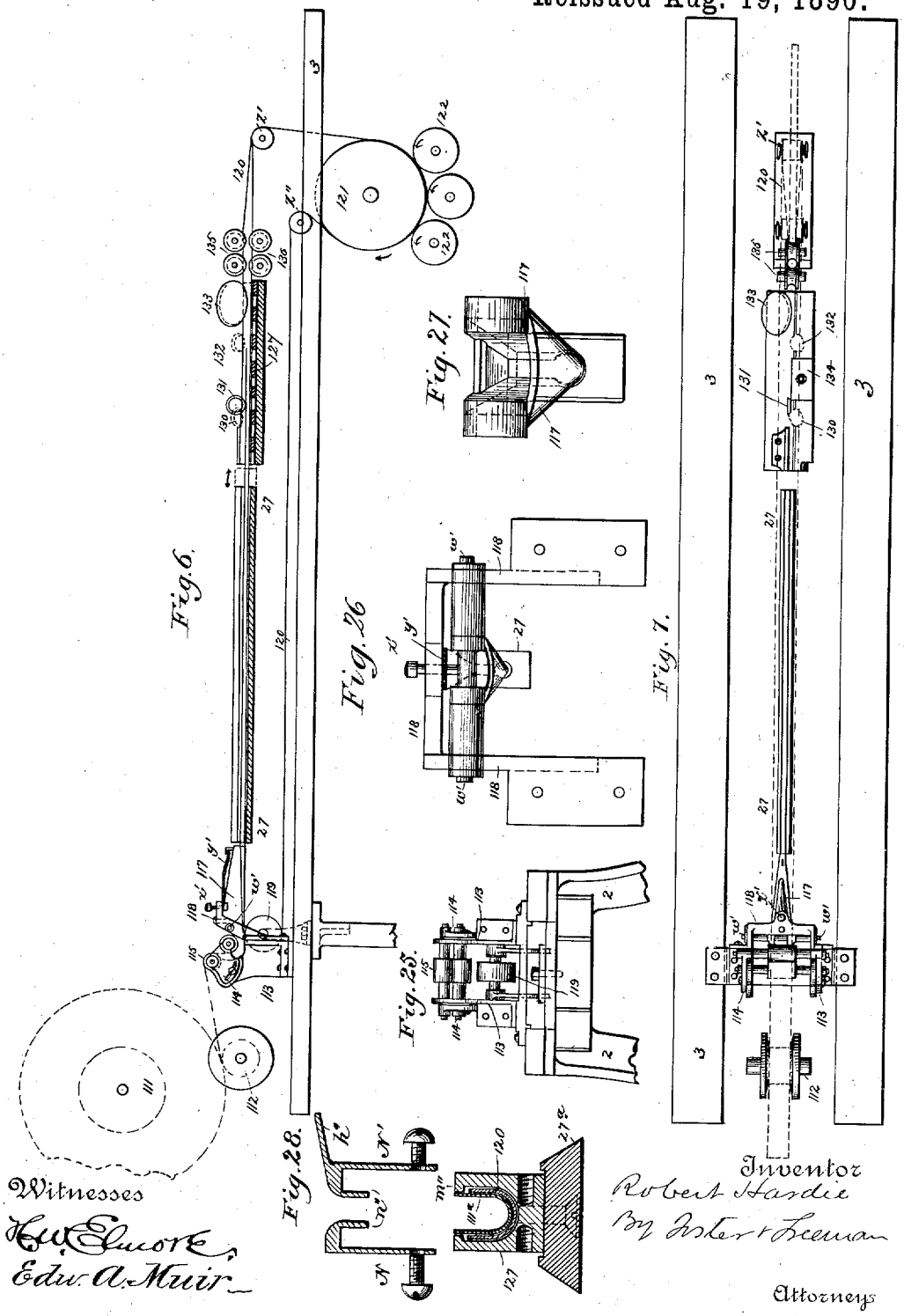
Witnesses
H. W. Elmore
Edw. A. Muir
Inventor
Robert Hardie
By Asbert Freeman
Attorneys

R. HARDIE.
Assignor to H. C. ELLIOT.
CIGARETTE MACHINE.
No. 11,104. Reissued Aug. 19, 1890.
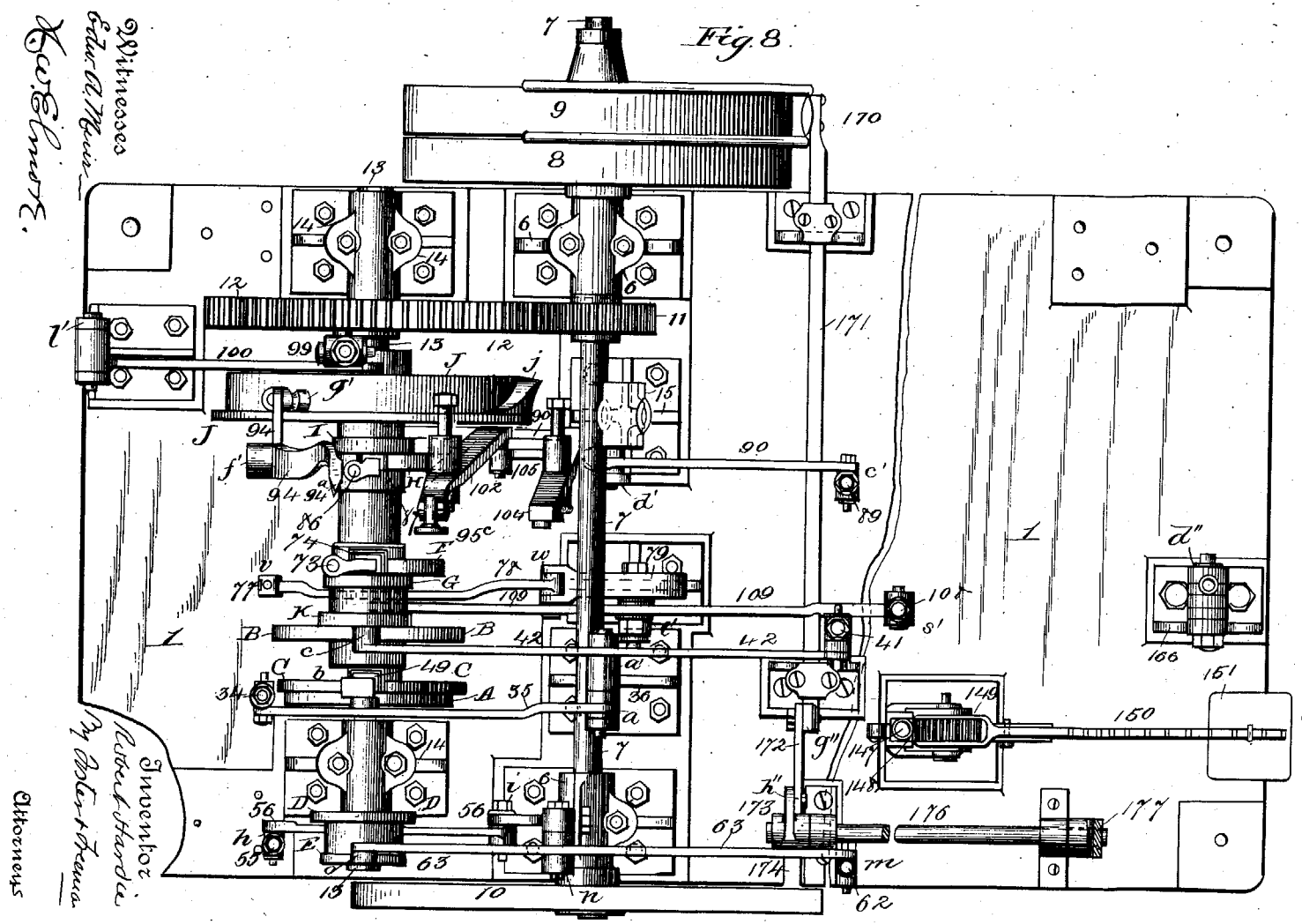
Witnesses
Edw. A. Muir
H. W. Elmore.
Inventor
Robert Hardie
By Foster & Freeman
Attorneys

R. HARDIE.
Assignor to H. C. ELLIOT.
CIGARETTE MACHINE.
No. 11,104. Reissued Aug. 19, 1890.
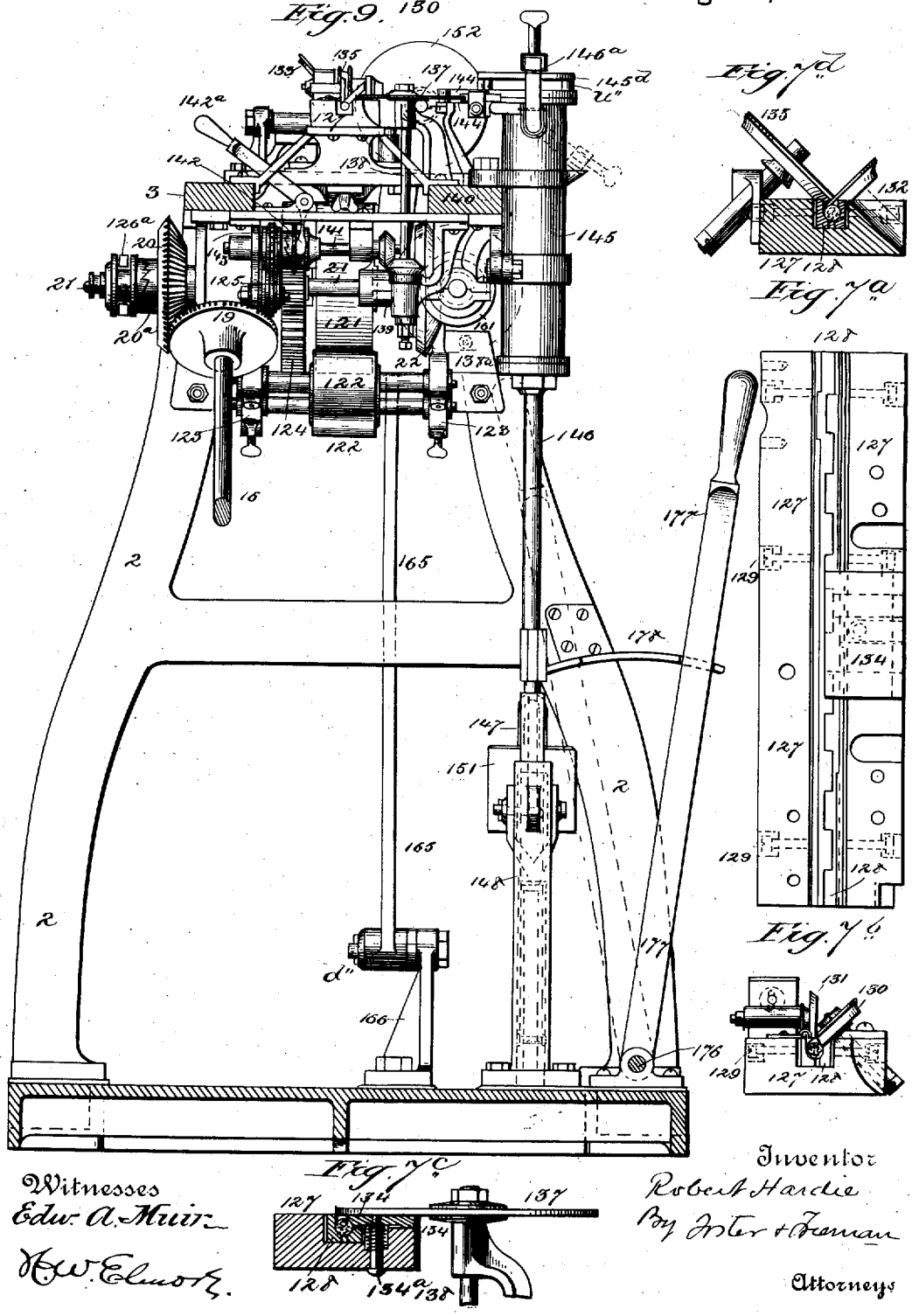
Witnesses
Edw. A. Muir
H. W. Elliott
Inventor
Robert Hardie
By Foster & Freeman
Attorneys

R. HARDIE.

Assignor to H. C. ELLIOT.

CIGARETTE MACHINE.

No. 11,104. Reissued Aug. 19, 1890.

Witnesses
Edw. A. Muir
H. W. Elliott

Inventor
Robert Hardie
By Foster & Freeman
Attorneys

R. HARDIE.

Assignor to H. C. ELLIOT.

CIGARETTE MACHINE.

No. 11,104. Reissued Aug. 19, 1890.

Witnesses
Edw. A. Muir
H. W. Elliott

Inventor
Robert Hardie
By Foster & Freeman
Attorneys

R. HARDIE.

Assignor to H. C. ELLIOT.

CIGARETTE MACHINE.

No. 11,104. Reissued Aug. 19, 1890.

Witnesses
Edw. A. Muir
H. W. Elliott

Inventor
Robert Hardie
By Foster & Freeman
Attorneys

R. HARDIE.

Assignor to H. C. Elliot.

CIGARETTE MACHINE.

No. 11,104. Reissued Aug. 19, 1890.

Witnesses
H. W. Elliot
Edw. A. Muir

Inventor
Robert Hardie
By Wm. Ivers Freeman
Attorney

22 Sheets—Sheet 13.

R. HARDIE.

Assignor to H. C. ELLIOT.

CIGARETTE MACHINE.

No. 11,104. Reissued Aug. 19, 1890.

Witnesses
Edw. A. Muir
H. W. Elliott

Inventor
Robert Hardie
By Peter O. Freeman
Attorneys

R. HARDIE.

Assignor to H. C. ELLIOT.

CIGARETTE MACHINE.

No. 11,104. Reissued Aug. 19, 1890.

Witnesses
Edw. A. Muir
H. W. Elmore

Inventor
Robert Hardie
By Foster & Freeman
Attorneys

R. HARDIE.

Assignor to H. C. ELLIOT.

CIGARETTE MACHINE.

No. 11,104. Reissued Aug. 19, 1890.

Witnesses
Edw. A. Muir
H. W. Elmore

Inventor
Robert Hardie
By Foster & Freeman
Attorneys

R. HARDIE.

Assignor to H. C. ELLIOT.

CIGARETTE MACHINE.

No. 11,104. Reissued Aug. 19, 1890.

Witnesses
H. W. Elliot
Edw. A. Muir

Inventor
Robert Hardie
By Foster & Freeman
Attorneys

R. HARDIE.

Assignor to H. C. ELLIOT.

CIGARETTE MACHINE.

No. 11,104. Reissued Aug. 19, 1890.

Witnesses
H. W. Elliott
Edw. A. Muir

Inventor
Robert Hardie
By Foster & Freeman
Attorneys

R. HARDIE.

Assignor to H. C. ELLIOT.

CIGARETTE MACHINE.

No. 11,104. Reissued Aug. 19, 1890.

Witnesses
Edw. A. Muir.
H. W. Elmore.

Inventor
Robert Hardie
By Foster & Freeman
Attorneys

R. HARDIE.
Assignor to H. C. ELLIOT.
CIGARETTE MACHINE.
No. 11,104. Reissued Aug. 19, 1890.
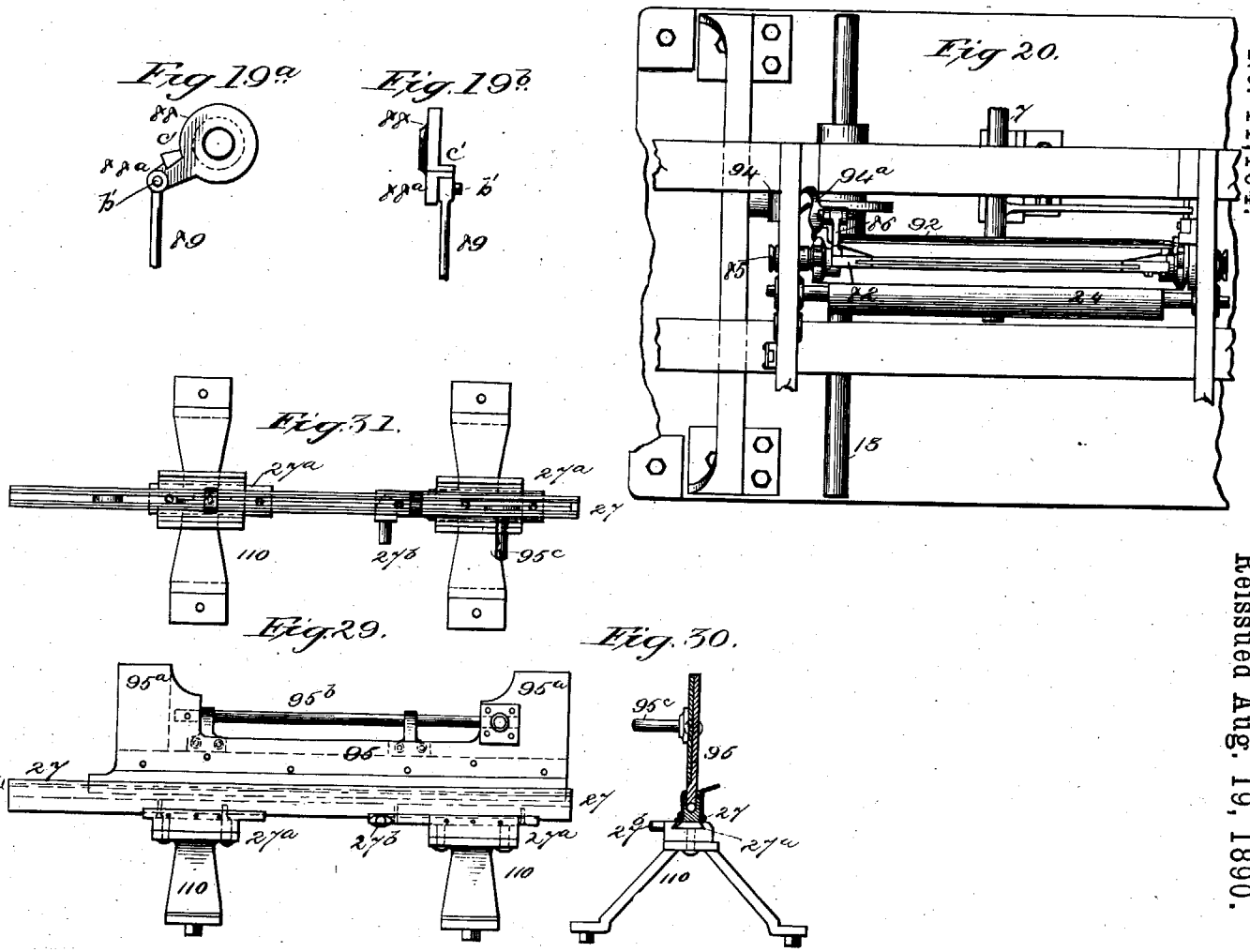
Witnesses
H. W. Elmore
Edw. A. Muir
Inventor
Robert Hardie
By Foster & Freeman
Attorneys

R. HARDIE.

Assignor to H. C. ELLIOT.

CIGARETTE MACHINE.

No. 11,104. Reissued Aug. 19, 1890.

Witnesses
H. W. Elliot
Edw. A. Muir

Inventor
Robert Hardie
By Peters & Fraser
Attorney

R. HARDIE.
Assignor to H. C. ELLIOT.
CIGARETTE MACHINE.
No. 11,104. Reissued Aug. 19, 1890.
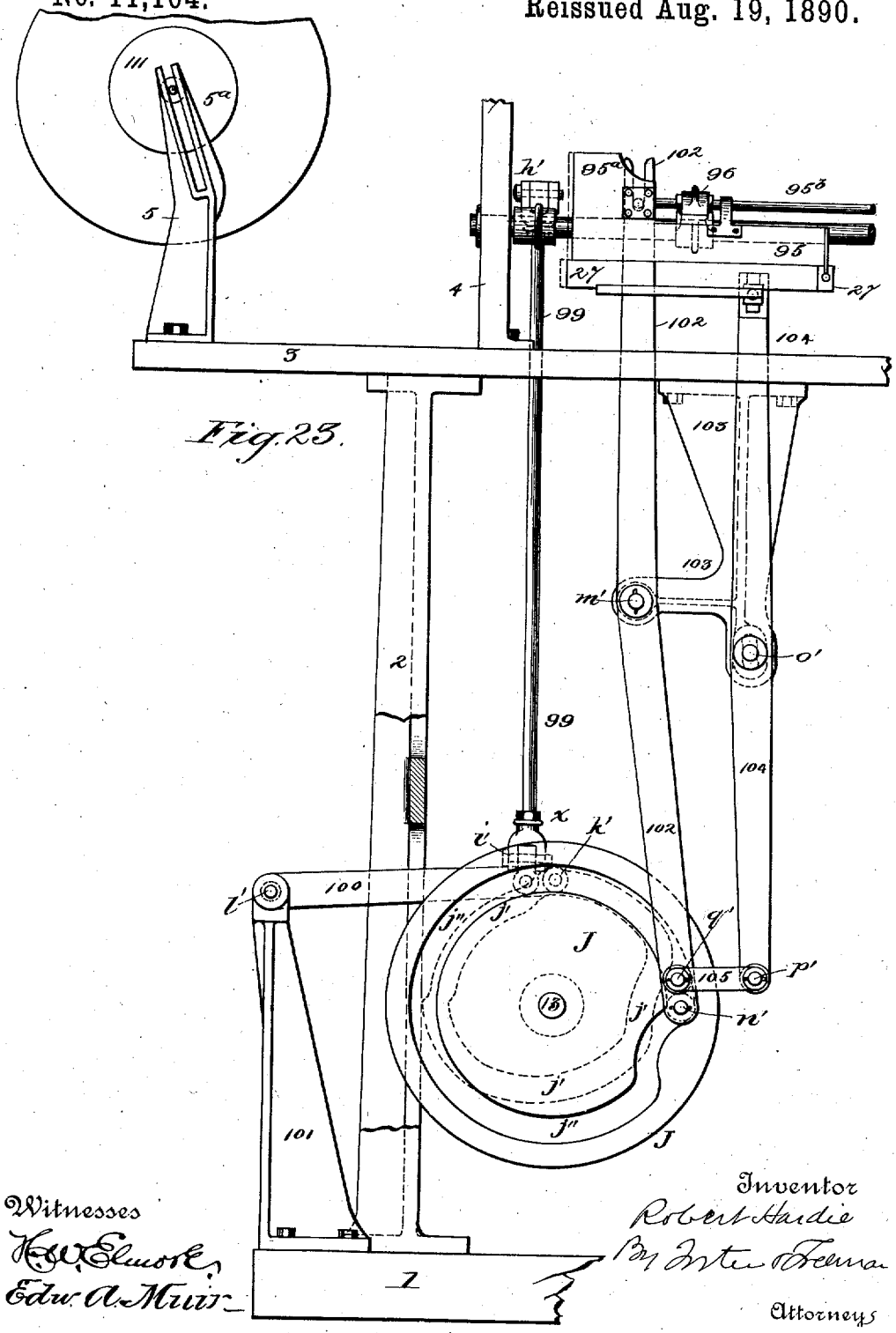
Witnesses
H. W. Elmore
Edw. A. Muir
Inventor
Robert Hardie
By Inter & Freeman
Attorneys

R. HARDIE.

Assignor to H. C. ELLIOT.

CIGARETTE MACHINE.

No. 11,104. Reissued Aug. 19, 1890.

Witnesses
H. W. Elmore
Edw. A. Muir

Inventor
Robert Hardie
By Foster & Freeman
Attorneys

UNITED STATES PATENT OFFICE.

ROBERT HARDIE, OF BROOKLYN, ASSIGNOR TO H. C. ELLIOT, OF NEW YORK, N. Y.

CIGARETTE-MACHINE.

SPECIFICATION forming part of Reissued Letters Patent No. 11,104, dated August 19, 1890.

Original No. 429,031, dated May 27, 1890; application for reissue filed June 2, 1890. Serial No. 354,077.

*To all whom it may concern:*

Be it known that I, ROBERT HARDIE, a citizen of the United States, residing at Brooklyn, in the county of Kings and State of New York, have invented certain new and useful Improvements in Cigarette-Machines; and I do hereby declare the following to be a full, clear, and exact description of the invention, such as will enable others skilled in the art to which it appertains to make and use the same.

This invention relates to an automatic cigarette-machine in which loose tobacco-stock spread in a layer is parted by positive mechanism into windrows of uniform width and quantity, then formed into a continuous compact filler-rod, to which is applied a continuous inclosing-wrapper suitably pasted and sealed, forming a continuous cigarette-rod, which is carried forward and cut into suitable lengths for cigarettes.

My improved machine comprises the following main features of construction: a feed-table and a traveling feed belt or apron upon which a layer of stock is parted into loose rows to be compressed into compact rods; a pair of parting-bars with blades and operating mechanism for parting the layer of stock into windrows; scrapers and operating mechanism for cleaning the parting-blades, so that they may not become clogged with stock; a forwarding and distributing device for pushing forward and leveling the windrow of loose stock on the feed-apron; a forwarding and retaining device consisting, essentially, of a bar having a curved blade for carrying the row of stock into proper position and supporting it or partly supporting it while being formed and compressed into a rod; a pair of gripper-jaws for compressing the loose row of stock in one direction between them; a compressing and forming tongue operating between the jaws for compressing the stock in the other direction into a compact rod against the blade of the forming-bar, and also for delivering the rod into the receiving-channel; locking mechanism for engaging and locking the gripper-jaws together, and means for releasing them at the proper moment, so that the compressed filler-rod may be delivered by the tongue to the receiving-channel; a peculiarly-constructed receiving-channel and connecting mechanism for giving such channel and the compressing-tongue a longitudinal reciprocating motion; a peculiarly-formed pivoted former for curving the paper ribbon and the carrying-tape and partially folding them for passage through the receiving-channel; a paper-reel and guide-roller for conducting off the paper ribbon always at the same height, so that it may be folded by the former without crimp or break; an adjustable folding-channel having beveled folding-rollers and other attachments for wrapping the paper-ribbon around the cigarette-rod; a paste-cylinder and paste-applying wheel and their operating mechanism; a tape-conveying drum and a system of rollers for unfolding the tape and returning it to the receiving-channel; a reciprocating cutter-frame or carriage having a tubular holder for the passage of the cigarette-rod and carrying a revolving cutter-head provided with an eccentric-blade for cutting the cigarette-rod into suitable lengths without danger of spreading or bursting the wrapper, and mechanism for reciprocating the cutter-frame and operating the revolving cutter.

The object of my invention is to provide for positively and continuously forming a layer of tobacco-stock into uniform windrows, then compressing and forming such windrows into compact rods of less diameter than the finished cigarette, and lapping the short rods together at their ends to form a continuous filler; also, to provide a simplified arrangement of the filler-carrying tape and the paper ribbon and their operating mechanism for folding and conducting them together through the receiving and folding channels, having parallel walls from end to end; also, to provide for better folding, pasting, and sealing the paper ribbon around the filler-rod; also, to provide improved mechanism for cutting the continuous cigarette-rod into suitable lengths without injury to the wrapper or filler, all as will be hereinafter more fully described.

The parts and combinations of parts constituting my invention will be defined in the claims.

My machine is illustrated in the accompanying drawings, in which—

Figure 2:
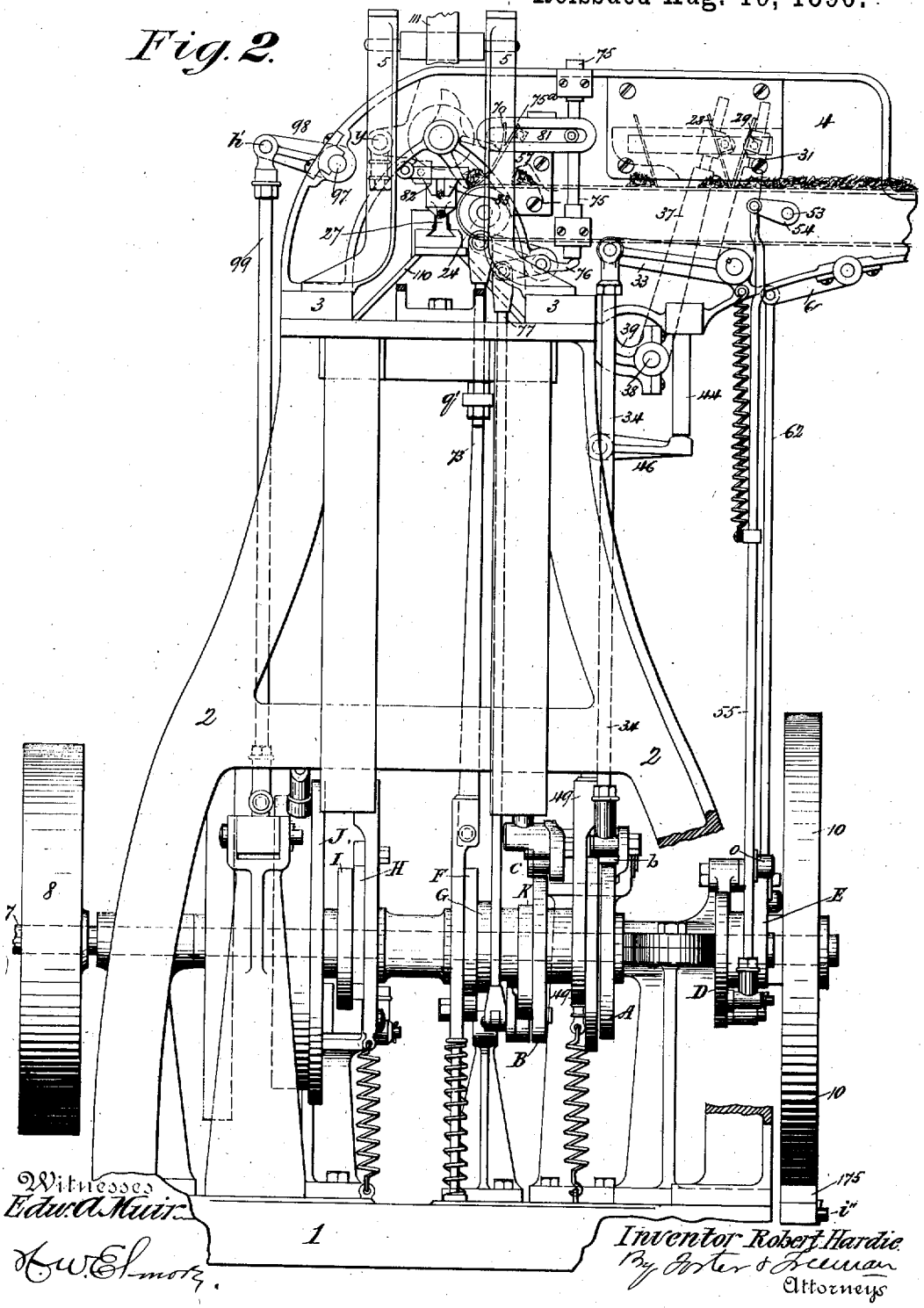
Figure 5:
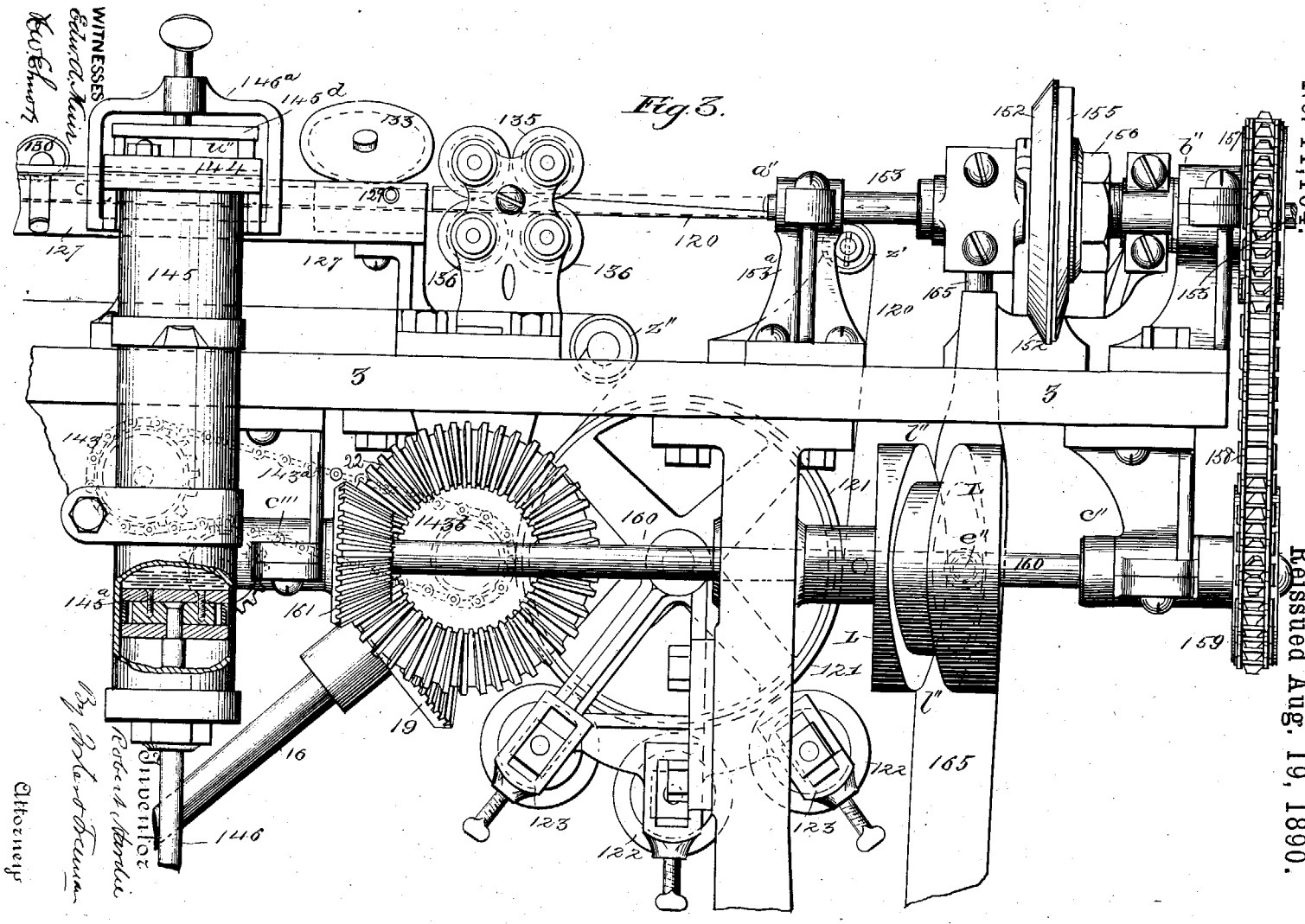
Figure 5:
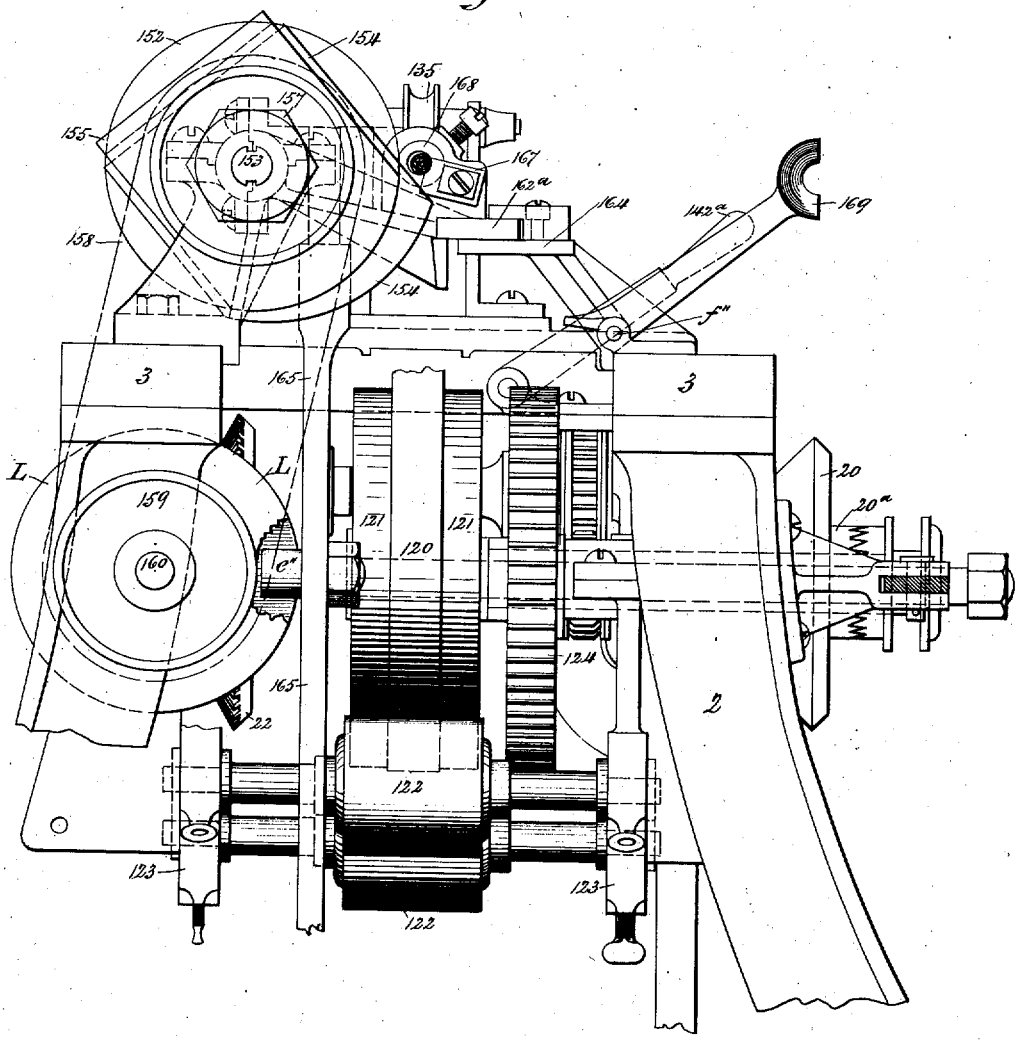
Figure 5A:
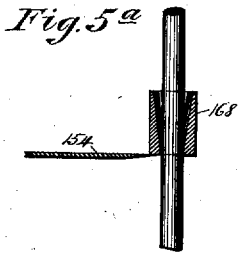
Figure 5B:
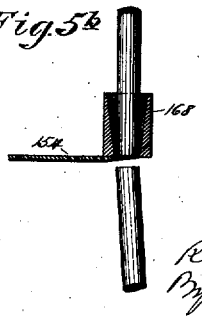
Figure 10:
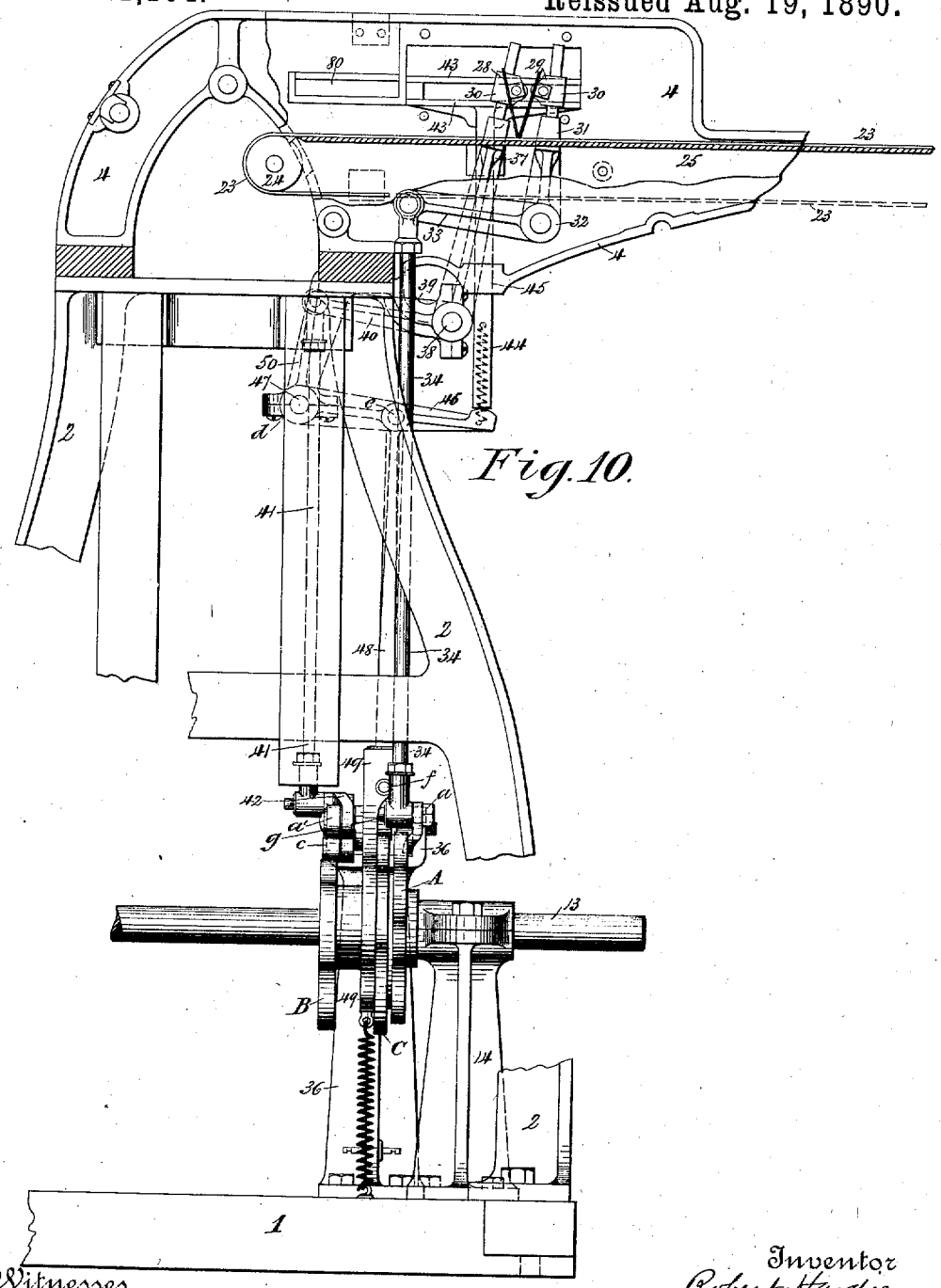
Figure 11:
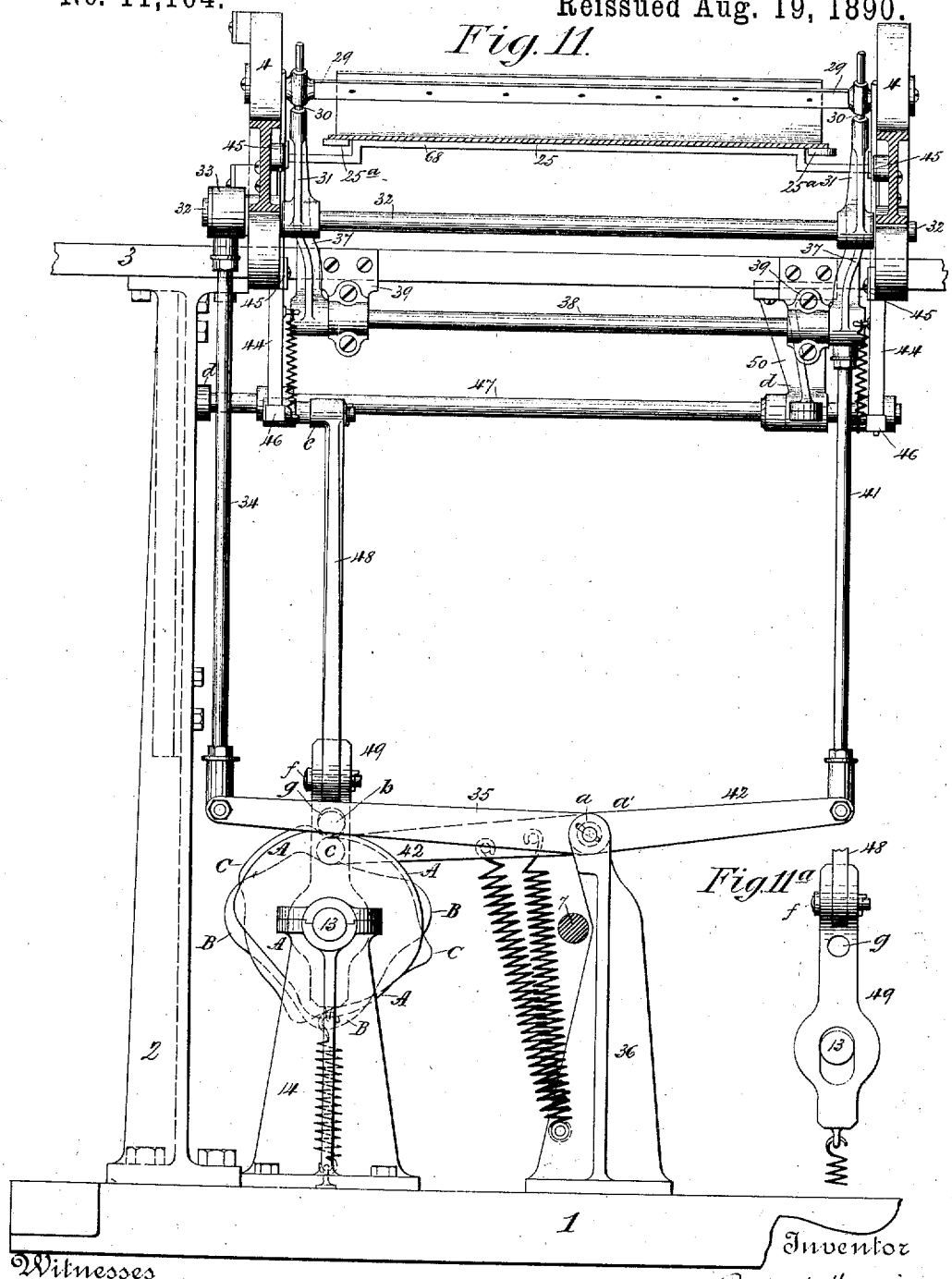
Figure 12:
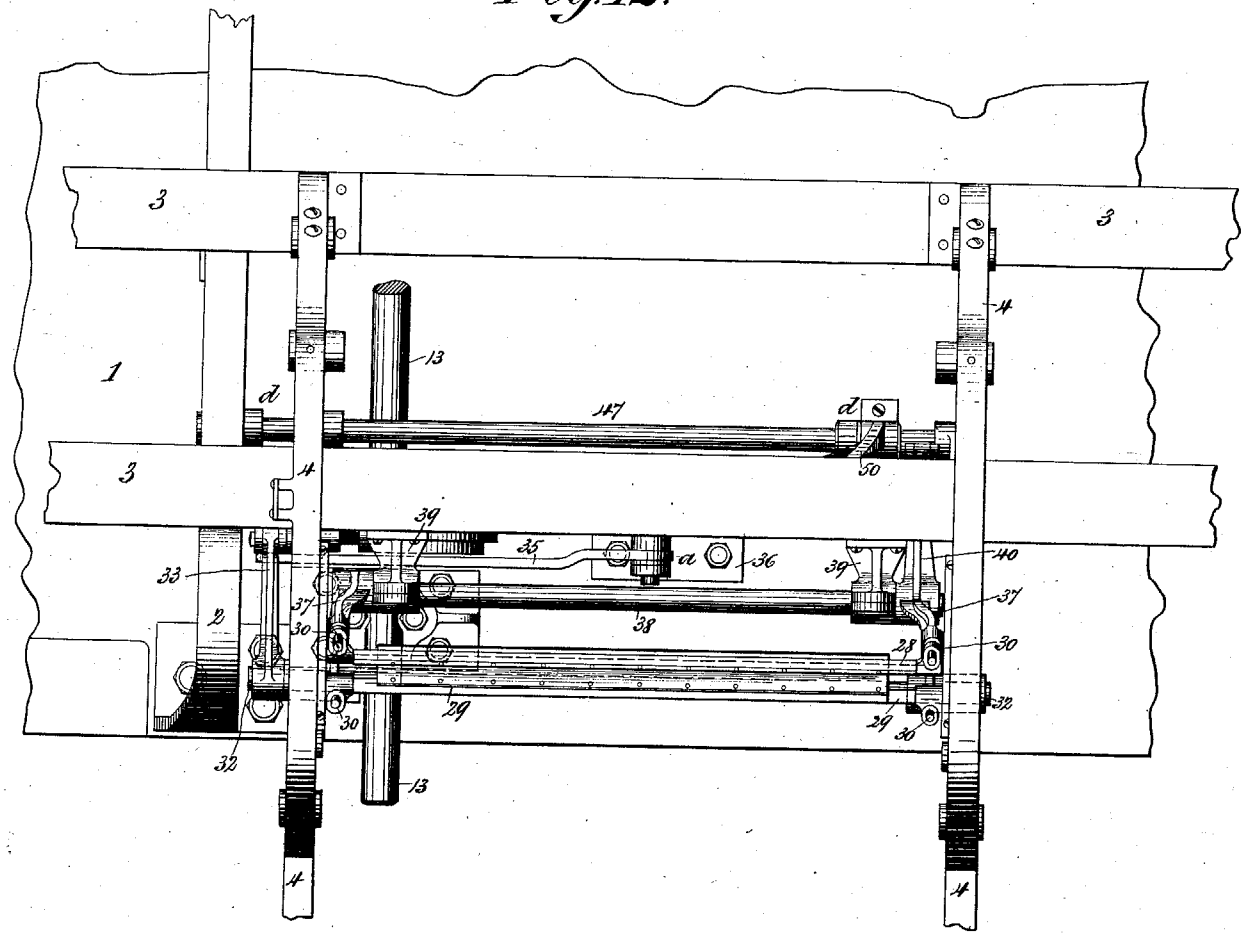
Figure 13:
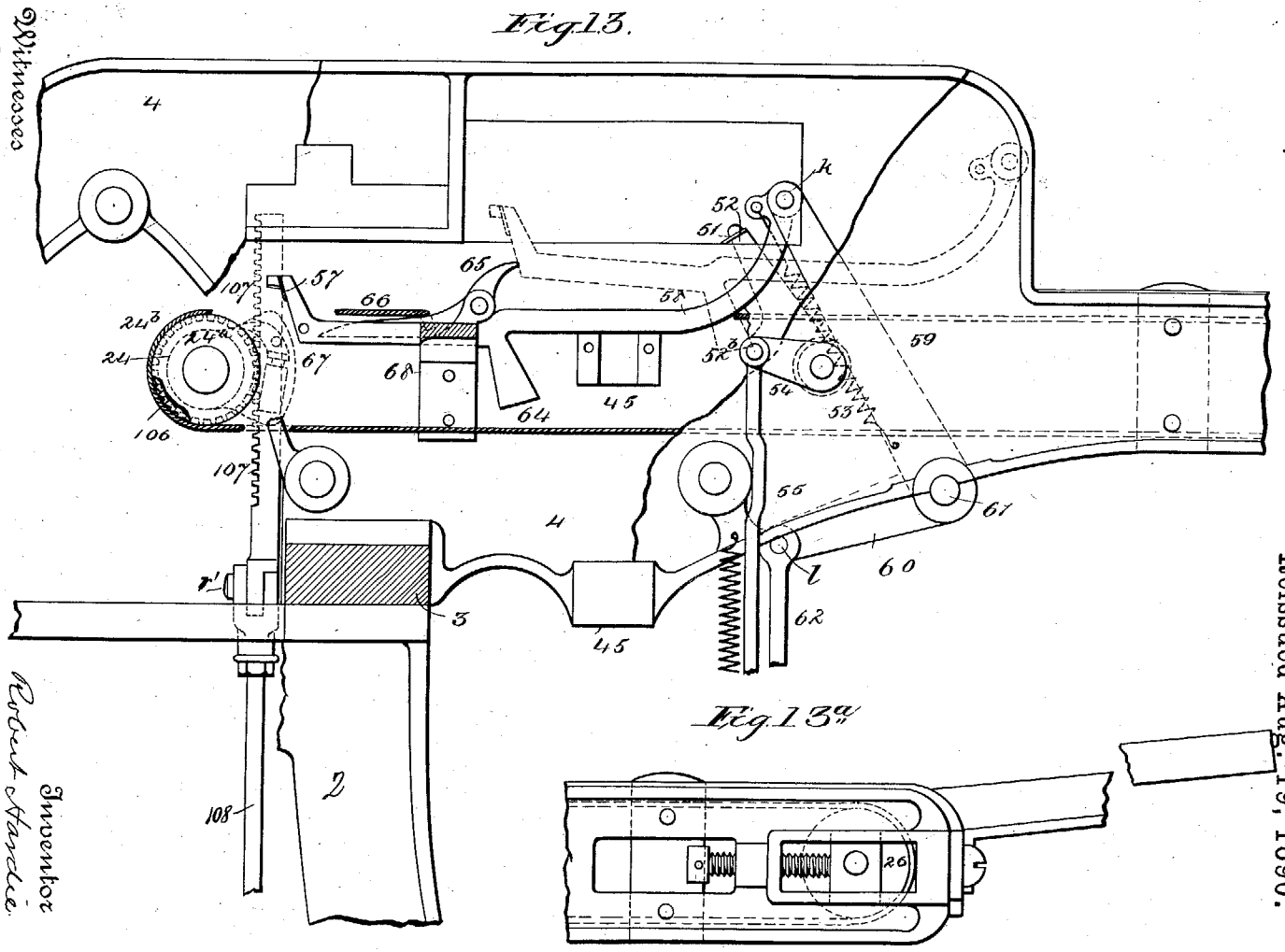
Figure 14:
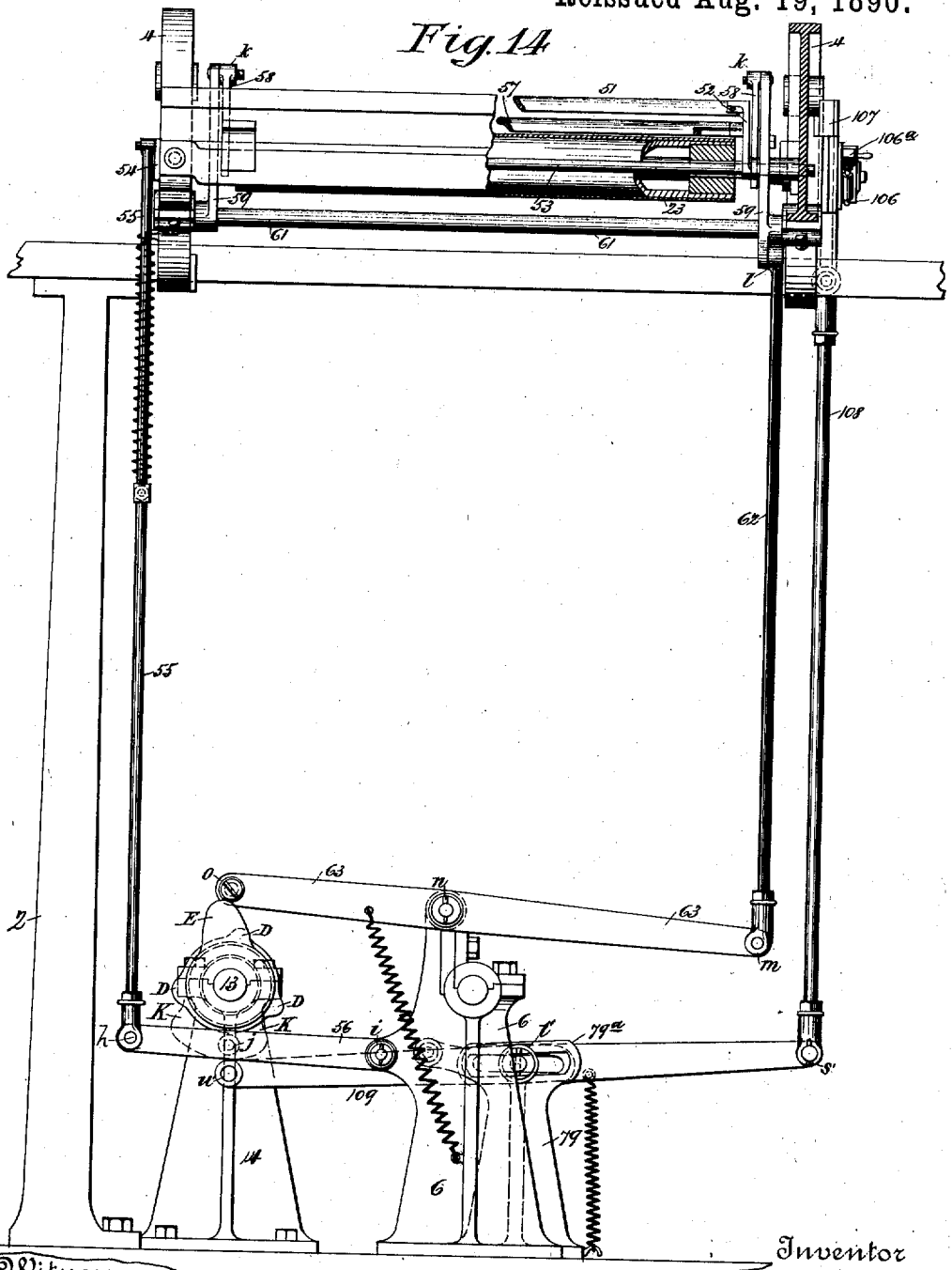
Figure 15:
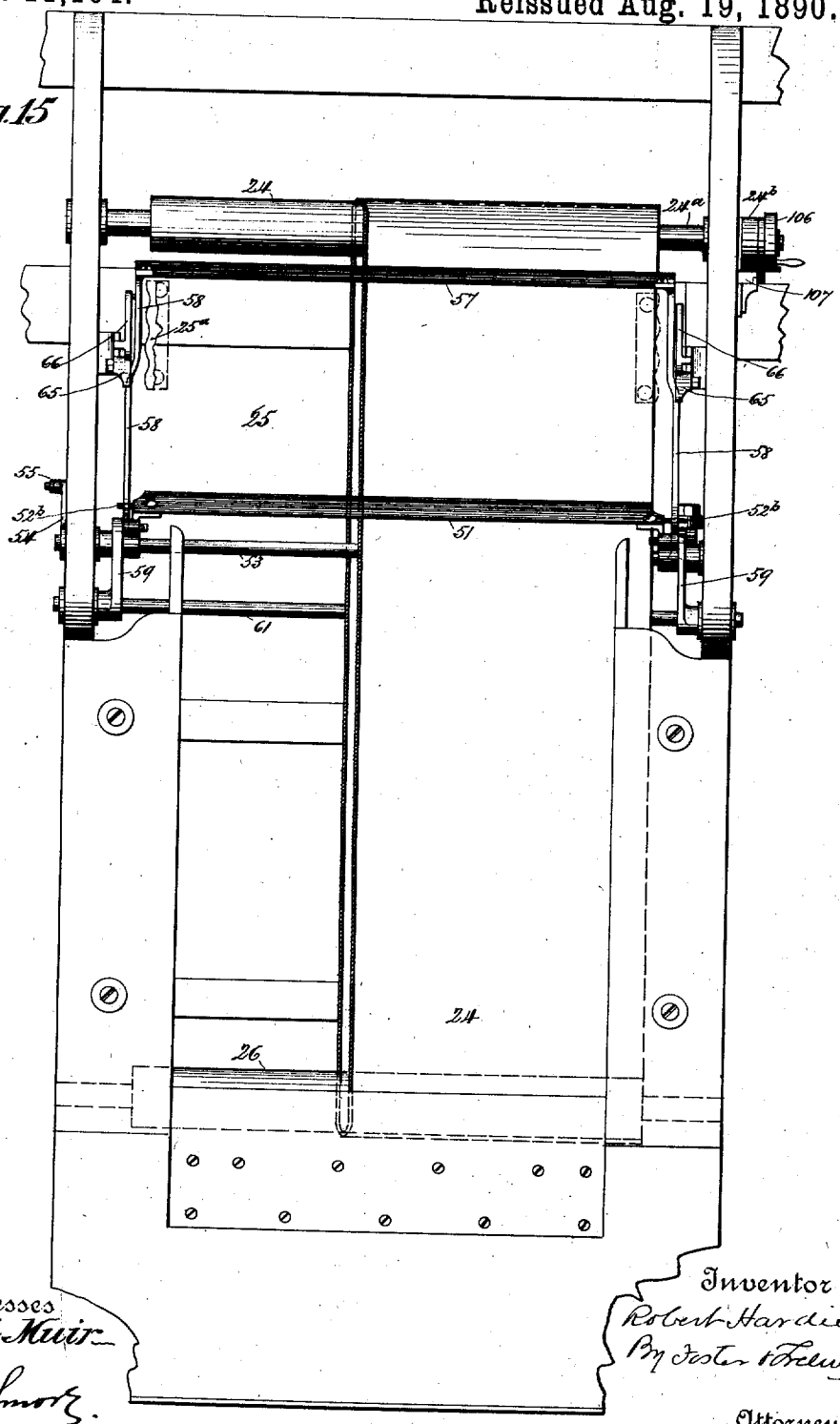
Figure 16:
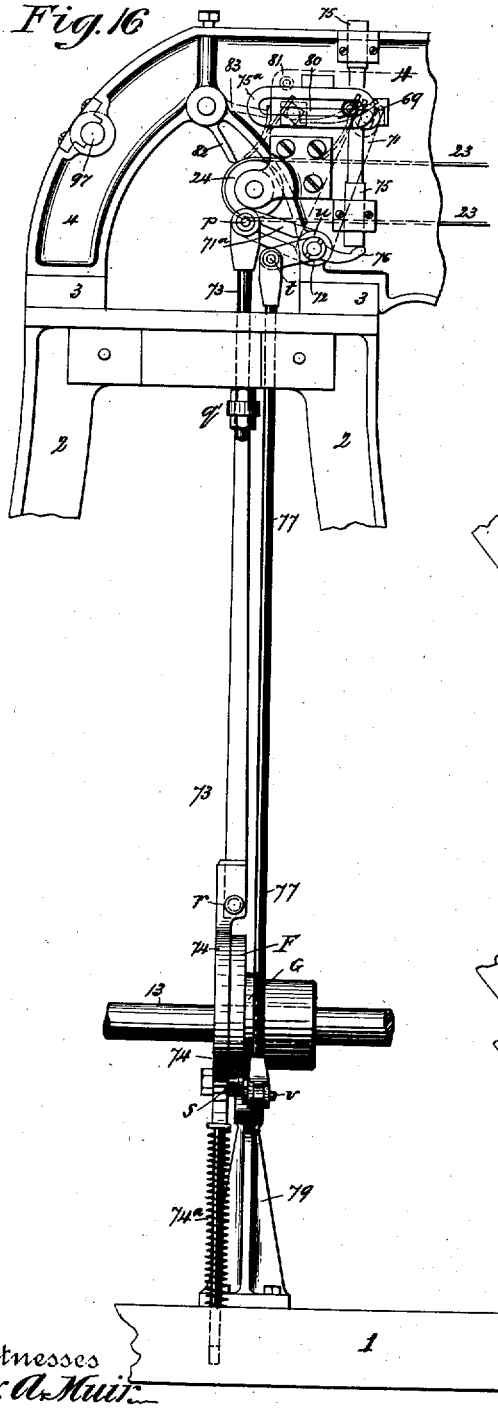
Figure 16A:
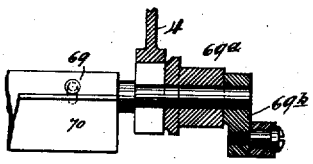
Figure 18A:
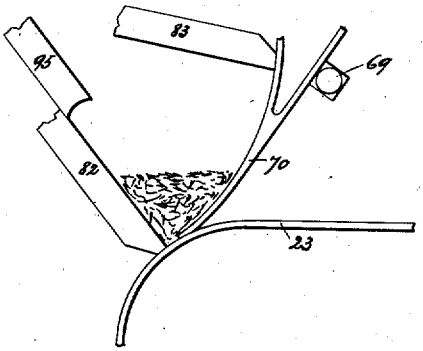
Figure 18B:
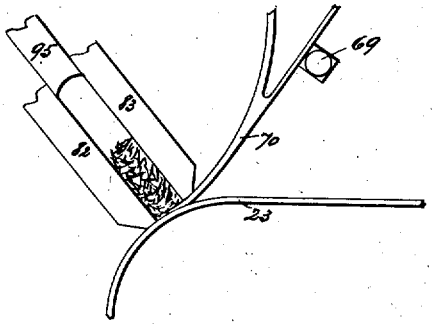
Figure 17:
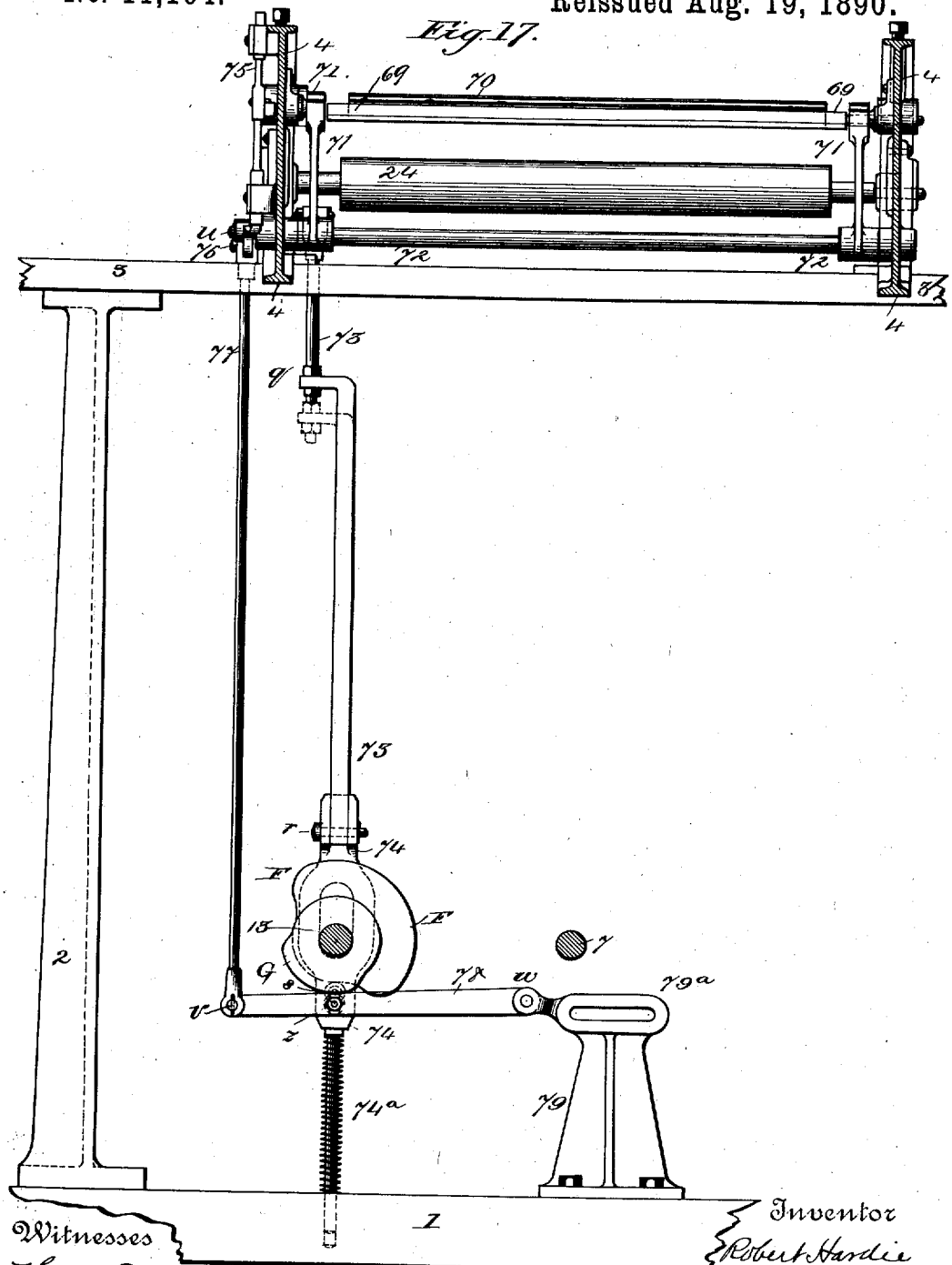
Figure 18:
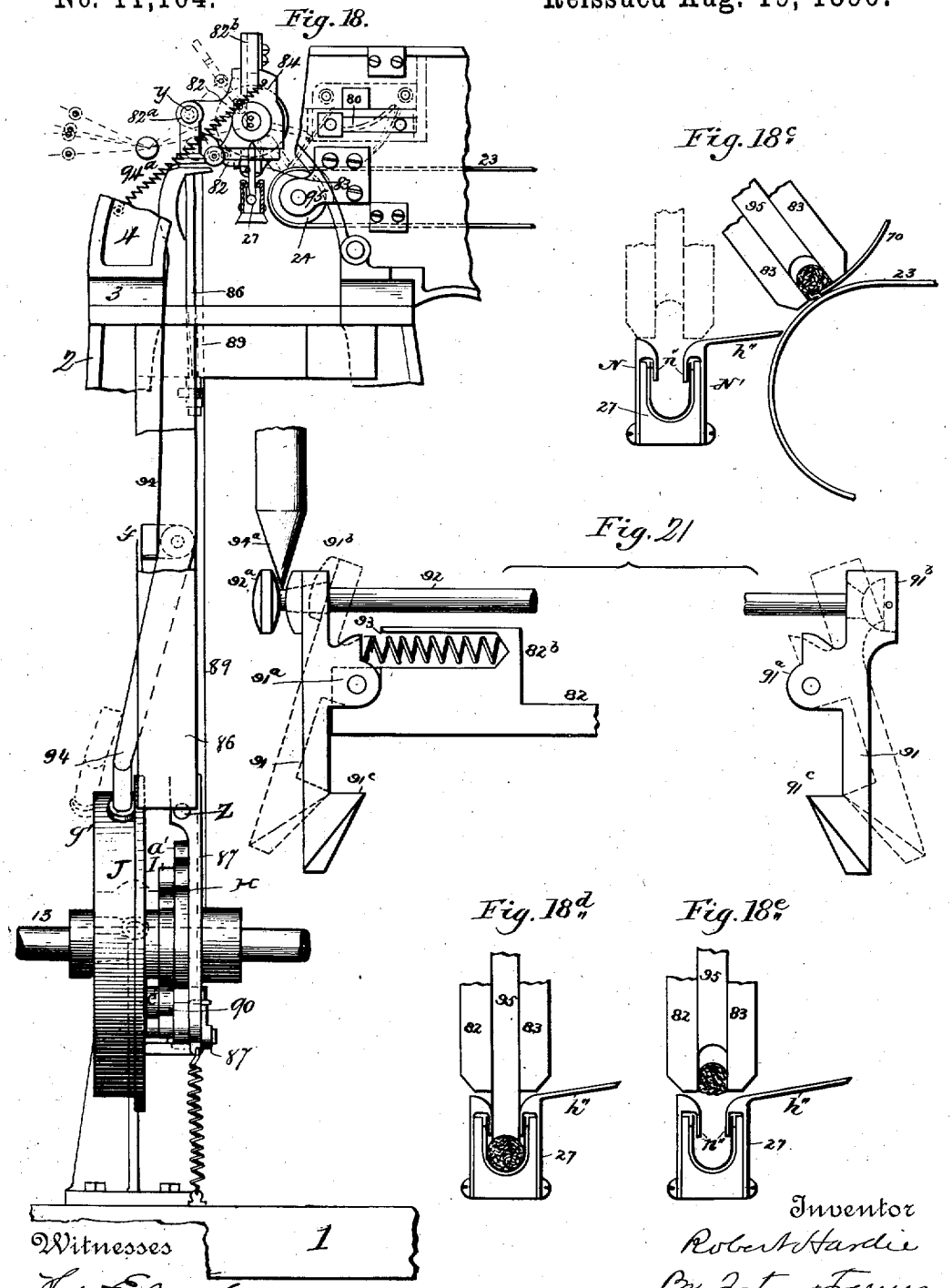
Figure 19:
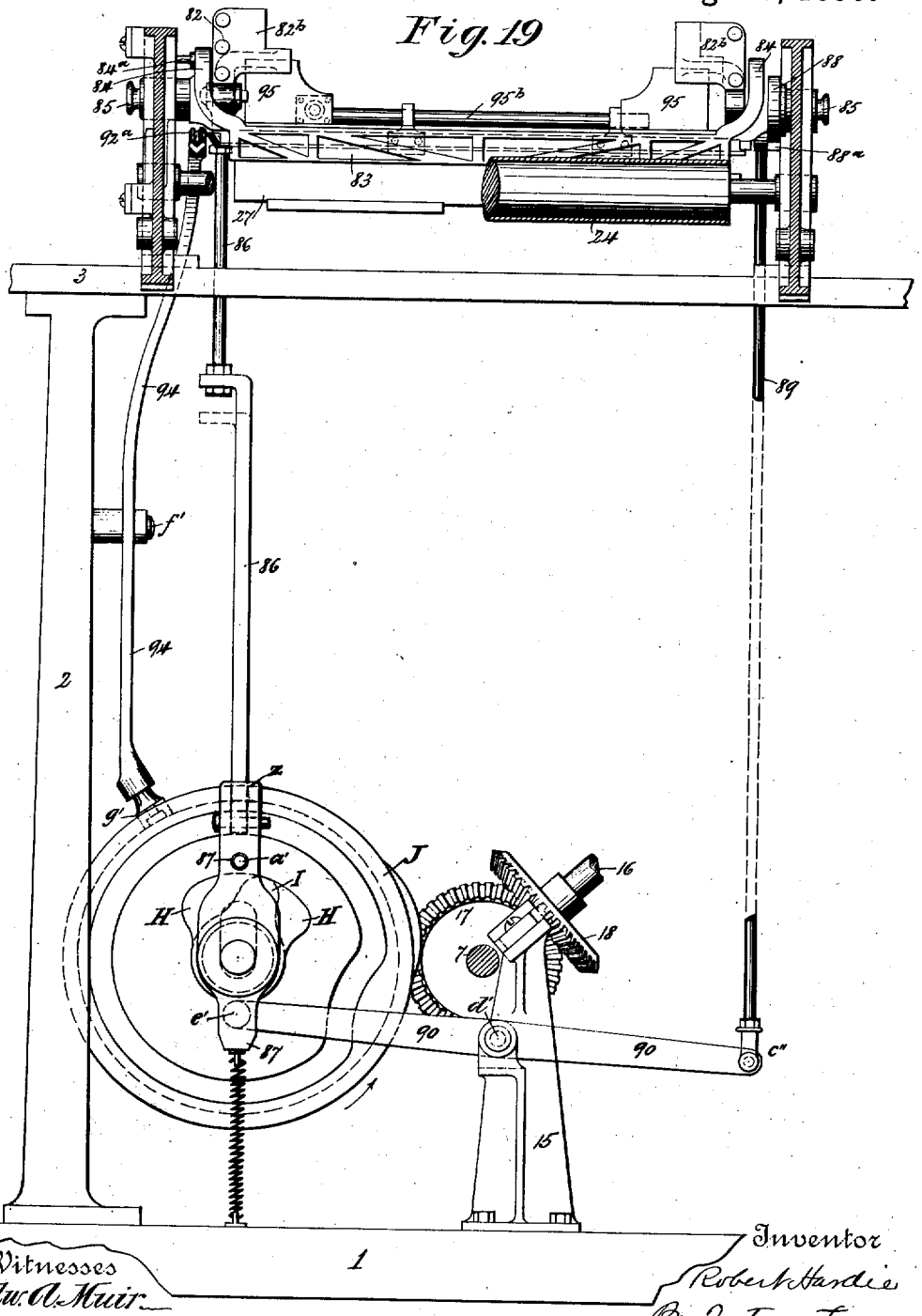
Figure 22:
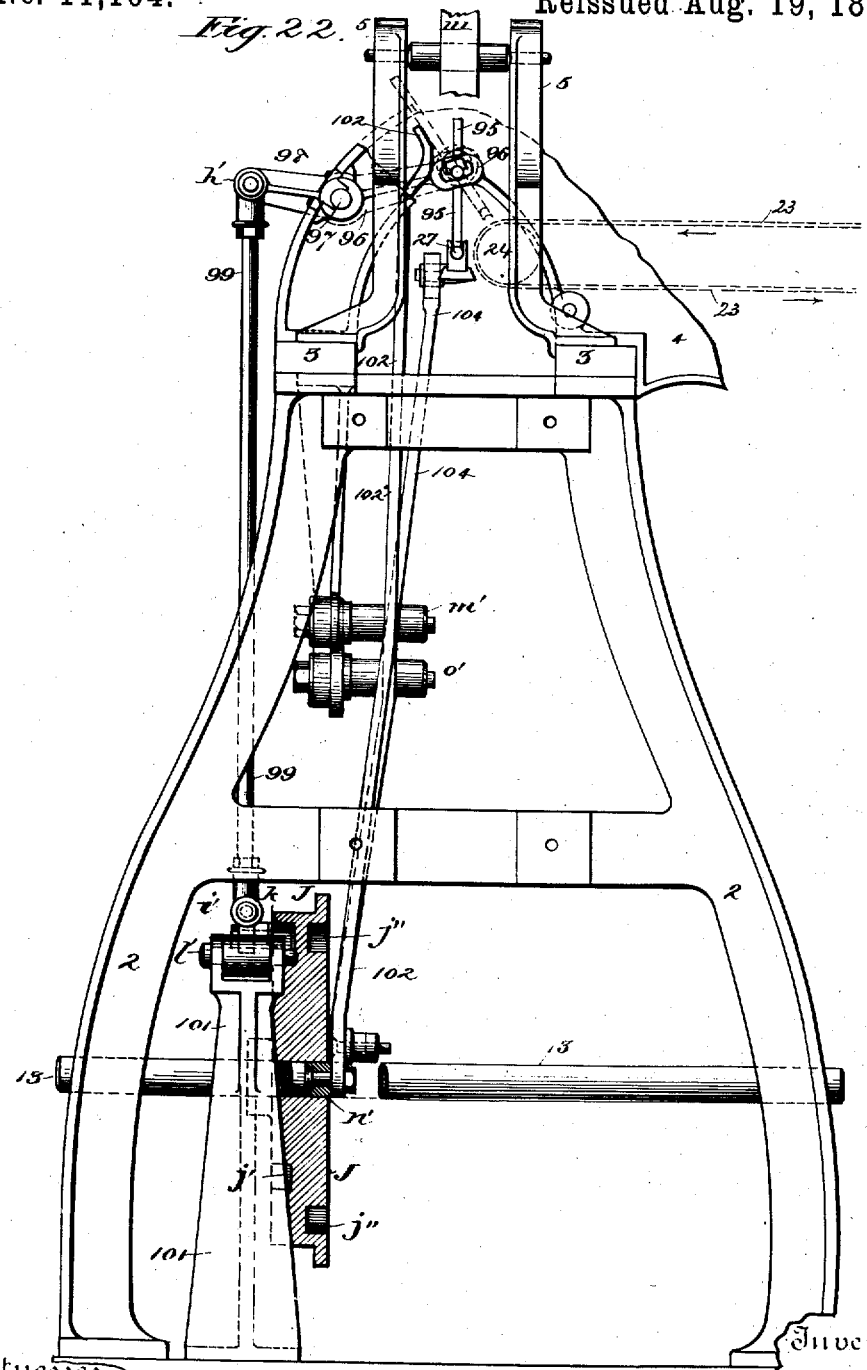
Figure 2:
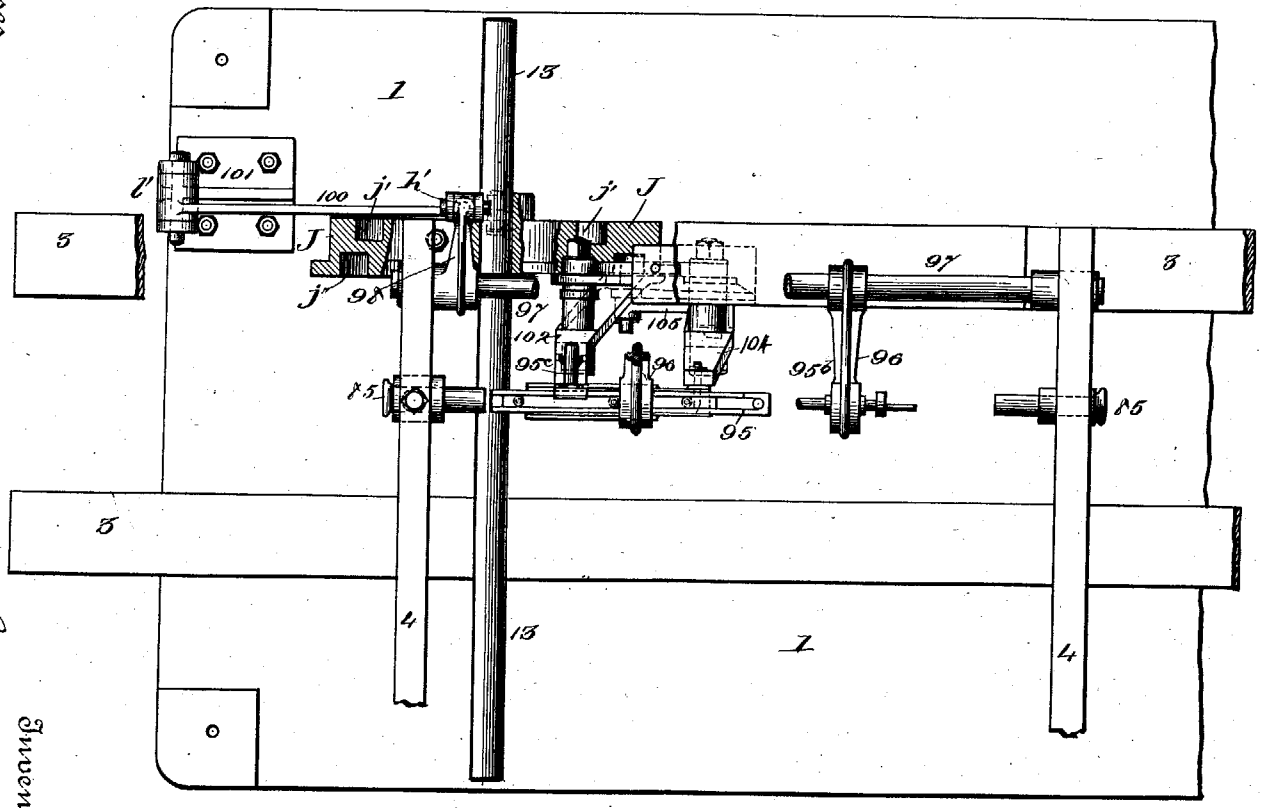

Figure 1 represents a side elevation of the machine with the side feed-table and other parts broken away. Fig. 2 represents a front end elevation with part of the side feed-table also broken away. Fig. 3 represents a side elevation, on an enlarged scale, of that portion of the machine to the right of line *a b* in Fig. 1. Fig. 4 represents a top plan view thereof. Fig. 5 represents a rear end elevation of the upper part of the machine. Figs. $5^a$ and $5^b$ represent sectional details of the tubular holder and cutter-blade. Fig. 6 represents a sectional detail view, partly in elevation, showing the receiving and folding channels in longitudinal section and illustrating the line of travel of the filler-carrying tape and paper ribbon from the front end of the machine to near the cutter at the rear end of the machine. Fig. 7 represents a top plan view thereof. Figs. $7^a$, $7^b$, $7^c$, and $7^d$ represent detail views of the folding channel and rollers. Fig. 8 represents a plan view of the base of the machine, showing the main shaft and cam-shaft, the cams, and connections. Fig. 9 represents a vertical section on line *a b*, Fig. 1, looking toward the rear of the machine. Fig. 10 represents a sectional end elevation illustrating the parting-bars and their operating mechanism. Figs. 11 and 12 represent, respectively, a side elevation and a top plan view thereof. Fig. $11^a$ represents a detail view of the slotted saddle-guide. Fig. 13 represents a sectional elevation illustrating the forwarding-bar, which also acts as a scraper, and another scraper, and their operating mechanism, also mechanism for operating the apron. Fig. $13^a$ represents a side elevation of part of the feed-table. Figs. 14 and 15 represent, respectively, a side elevation and a top plan view of devices represented by Figs. 13 and $13^a$. Fig. 16 represents an end elevation of the forwarding and retaining devices and their operating mechanism. Fig. $16^a$ is a detail view of the forwarding and retaining device. Fig. 17 represents a side elevation thereof. Fig. 18 represents a sectional elevation of the gripper-jaws and their operating mechanism. Figs. $18^a$, $18^b$, $18^c$, $18^d$, and $18^e$ represent sectional details of the gripper-jaws and of their compressing, forming, and delivering tongue in different positions which they assume in operating upon the tobacco before, and also after, it is deposited in the receiving-channel. Figs. 19 and 20 represent, respectively, a side elevation and a top plan view thereof. Figs. $19^a$ and $19^b$ represent details of the locking connections. Fig. 21 represents a sectional detail of the locking mechanism. Fig. 22 represents an end elevation of the compressing, forming, and delivering tongue and its operating mechanism. Figs. 23 and 24 represent, respectively, a side elevation and a top plan view thereof. Figs. 25, 26, and 27 represent end views of the frame for the former, the former and tension-rolls for the paper on the same sheet with Figs. 6 and 7. Fig. 28 represents a vertical cross-section, on an enlarged scale, of the receiving-channel with parts detached. Figs. 29, 30, and 31 represent, respectively, a side elevation, a vertical section, and a top plan view of the compressing-tongue and receiving-channel.

In order that the purpose and effects of the various operating devices now to be described may be understood, I will first briefly set forth the operations upon the stock or material and the actions of the devices which operate directly upon such stock and first form it into a rod or filler and to then apply and inclose the wrapper.

The stock X is first deposited in a thin layer upon a feed-table, which is shown as provided with a traveling feed-belt 23, Fig. 2. A blade 28 then carries a row of said stock along the table toward the jaws 82 83, Fig. $18^a$, between which the mass is clamped, as shown in Fig. $18^a$, a blade 70 aiding in carrying the material to a position to be clamped by the jaws. A tongue 95 then compresses the material into a solid block or rod against a suitable support, as the blade 70, the material being thus molded in a four-part mold, so that it forms a rod or section of the filler in its fully-compressed state before the application of the wrapper, thereby rendering unnecessary any further compression after the application of the wrapper. Meanwhile the wrapper in the form of a continuous strip is bent to a U shape transversely and is then conducted with a traveling belt 120, Fig. $18^e$, through a grooved support-guide or receiving-chamber 27, and the gripper-jaws then convey the rod to a position above the curved wrapper, and the tongue 95 descends and moves the rod from between the jaws, discharging it into the wrapper, as shown in Fig. $18^d$, where in some cases it will expand slightly, the end of the rod overlapping that previously deposited and the tongue 95 pressing the overlapped portions together to form a continuous filler. The belt 120 travels continuously, so that while the tongue 95 is in contact with the rod said tongue and the receiving-chamber 27 travel longitudinally, together with the belt, wrapper, and rod; but as soon as the tongue rises the chamber and tongue move longitudinally back to their former positions. The wrapper and filler are then carried by the belt from the reciprocating chamber 27 to a folding-chamber 128, where one edge of the paper is turned in, the paste applied to the standing edge, and the latter is then turned down and secured, the belt conducting the wrapper and rod until these operations are accomplished, after which it is deflected and the filled wrapper passes through a holder 168, which serves as a support and as an edge against which a revolving cutter 154 shears the same into short sections or cigarettes.

The machine is mounted upon a base or foundation plate 1, and is supported by the main frame 2 and bed-plate 3. A feed side frame 4 is secured to the bed-plate for carrying the various mechanism for feeding and forming the tobacco-stock into cigarette-rods. Slotted standards 5, Fig. 23, are secured to bed-plate 3 at the front end of the machine for carrying the paper ribbon, and each is provided with an inclined slot 5[a] for receiving the journals of the paper-ribbon reel. The main shaft 7, Fig. 8, is suitably journaled in standards 6, secured to the base, and carries driving-pulley 8, loose pulley 9, fly-wheel 10, and pinion 11, which latter meshes with the spur gear-wheel 12 on cam-shaft 13. The cam-shaft is journaled in standards 14 and carries the various cams—from A to J—for operating the feeding, forming, and other mechanism, as hereinafter described. A standard 15, Fig. 19, is secured to the base, and is provided at the top with a journal-box for carrying the inclined shaft 16, which is provided at its lower end with a miter-gear 18, meshing with miter-gear 17 on main shaft 7. The inclined shaft 16 is provided at its upper end with a bevel gear-wheel 19, Figs. 3 and 9, meshing into a bevel-gear 20, mounted by its toothed hub 20[a] upon a hollow shaft carried by the transverse shaft 21, which carries at its other end the bevel-gear 22 for driving the cutting mechanism, &c., as hereinafter described.

I will now describe the mechanism for feeding, forming, and compressing the stock into cigarette-rods preparatory to being wrapped in the paper ribbon, &c.

At the front end of the machine, and projecting from it at right angles, I provide a feed-table and arrange in it a feed-apron passing over feed-rollers 24 and 26, journaled, respectively, at the inner and outer ends of the table, Figs. 13 and 13[a]. An apron-supporting plate 25, Fig. 10, rests in the side frame 4 and acts as a support for the apron and the stock as it is being manipulated by the feed mechanism. The roller 26 at the front end of the table has an adjustable journal-box and screw for giving proper tension to the apron. Adjacent to the inner roller 24, I place the receiving-channel 27, (shown in position in Figs. 2, 18, and 22, and in longitudinal section in Fig. 6,) and extending at right angles to the line of travel of the feed-apron, as will be hereinafter fully described.

The first operation of the machine upon the tobacco-stock is performed by the parting-bars 28 and 29 working on feed-apron 23 and its support-plate 25, which bars and their operating mechanism are illustrated in Figs. 10, 11, and 12. The parting-bars are provided with blades extending transversely across the feed-apron, and are provided at both ends with cross-heads 30, having vertical holes for the cylindrical ends of the operating-levers to work through. The levers 31 for operating bar 29 are keyed to shaft 32, to which is also secured the connecting-lever 33, Fig. 10, to the free end of which is pivoted the vertical connecting-rod 34, connecting at its lower end to cam-lever 35, which is pivoted at *a* to standard 36, and is provided with a lateral roller *b*, resting on cam A, mounted on shaft 13. The operating-lever 37 for parting-bar 28 is keyed to transverse shaft 38, supported in brackets 39, and has a lateral arm 40. The lever-arms 37 and 40 are preferably formed in one piece, like a crank-lever. To the free end of lever 40 there is pivotally attached the connecting-rod 41 (shown at the right-hand side of Fig. 11,) and such rod 41 connects at its lower end with cam-lever 42, pivoted at *a'* to standard 36, and having at its free end roller *c*, working on cam B. The journals at the ends of the parting-bars are fixed in boxes, which are arranged to slide in the horizontal slots of the T-heads 43, working in each of the side frames. Vertical raising-rods 44 extend downward from the T-heads and slide in guideways 45 in the side frames 4 and rest at their lower ends upon the outer ends of levers 46, which have curved upper surfaces for such rods 44 to work on. Spiral springs attached to pins connect rods 44 with levers 46 to hold them in contact with one another, and also to give the desired tension of the parting-bars on the stock and apron. The raising-levers 46 are keyed to shaft 47, which is journaled at *d* in a hanger 50 and in the end frame 2. The raising connecting-rod 48 is pivoted at *e* to lever 46, and at *f* to the slotted saddle-guide 49, (shown in detail, Fig. 11[a],) which works over cam-shaft 13 and has a roller *g* bearing on cam C. The levers 31 and 37 and their connections operate to move the parting-bars back and forth horizontally for parting the tobacco-stock on apron 23, while the slotted T-heads 43 and raising-rods 44 and their connections operate to raise the parting-bars up above the stock on apron 23, and to lower them again when in the proper separated positions, in order to part the stock into transverse windrows.

In the operation of the parting-bars particles of tobacco adhere to them, and they would become clogged therewith if they were not cleaned, and for the purpose of cleaning them I provide scrapers 51 and 57, which are illustrated in Figs. 13, 14, and 15. The part 57 acts as a scraper, and also as a forwarding-bar for pushing the windrows of tobacco forward to the forwarding and retaining device, as will be hereinafter described. The scraper 51 is secured to the levers 52, which have short side arms 52[a], provided with lateral projecting pins 52[b] for supporting the shoes of the curved connecting-rods 58 of device 57 and giving motion to the same. The shaft 53 connects the levers 52, and is provided on the outside of the side frames 4 with lever 54, to which is pivoted the connecting-rod 55, which at its lower end is pivoted at *h* to the cam-lever 56, which latter is pivoted at $i$ to standard 6, and has a lateral roller $j$ bearing on cam D, Fig. 2. The connecting-rod 55 has a collar secured by a set-screw, with which connects a spiral spring attached at its upper end to the side frame for holding lever 56 and its roller $j$ up against cam D.

The device 57, which acts to forward and distribute the tobacco, also acts as a scraper, as above stated, and is provided with a projection or lip at its upper edge, which has a serrated under face $x$ for distributing and leveling the stock when a lateral motion is given to it during its forward movement when said face is on the stock.

In order to produce the vibrating motion, the supporting-plate 25 is provided at its edges with small plates $25^a$, having their edges formed with inner and outer curves appearing in plan view, Fig. 15, as an undulating line. The curved connecting-rods 58, by bearing against such curved edges, are given a vibrating motion, which is imparted to the device 57. The rear lower edge of the device 57 serves for cleaning the blade of parting-bar 28. The curved connecting-rods 58 are connected at joints $k$ to levers 59, which are keyed to shaft 61. The lever 60 may form a part of one of the levers 59, or be separately keyed to shaft 61, and has pivoted to it at $l$ the rod 62, which connects below at pivot $m$ with cam-lever 63, which is pivoted at $n$ to standard 6, and has at its outer end the roller $o$ bearing on cam E. This mechanism serves to move the device 57 back and forth. The curved connecting-rods 58 have at their outer ends short projections provided with pins, to which are connected spiral springs attached at their other ends to pins on levers 59 for drawing such rods and their device 57 downward. The rods 58 have projecting from their under sides the shoes 64, which rest, when the rods are drawn back, upon lateral pins $52^b$, projecting from the short arms $52^a$.

Trap-guides 65 and 66 are provided near each side frame for pins 67 of the device 57 to ride upon, and thereby raise it and the curved connecting-rods, thus raising shoe 64 onto pins $52^b$. The parts 65 of the trap-guides are secured to the ends of the transverse stay-rods 68, Figs. 13 and 15, on each side of the machine; but the parts 66 are pivoted at their ends to the parts 65, so that their ends are free to rise and fall, and they permit inwardly-projecting pins 67 on connecting-rods 58 to pass under and slightly raise them till such pins have passed beyond them, when their free ends will again fall and permit the pins to pass over their top surfaces, when the device 57 is drawn back. The pins 67 also pass over the top surfaces of the parts 65, thereby raising and seating shoes 64 on the lateral pins $52^b$. The stay-rod 68 is bolted to side frames 4. The device 57 pushes the windrow of loose tobacco-stock forward on the apron into position to be acted on by the forwarding and retaining device, the construction and operating mechanism of which will now be described.

The forwarding and retaining device and its operating mechanism are illustrated in Figs. 16 and 17 and in Figs. $18^a$ and $18^b$. The forwarding and retaining device has a bar 69, and this bar is provided with a curved blade 70, the lower edge of which comes in contact with the feed-apron 23. The forwarding and retaining device has a part that is square in cross-section, and is provided with cylindrical ends or axles $69^a$, Fig. $16^a$, which rest in boxes arranged to slide in the slot 80 in side frame 4, and has at its front end a little crank $69^b$ (jim-crank) with a roller, Fig. $16^a$, which works in a slotted cross-head $75^a$. The axles of the bar of the forwarding and retaining device are arranged in the slotted ends of levers 71, Fig. 17, which are keyed to rock-shaft 72, and serve to move the forwarding and retaining device forward and back. The rock-shaft 72 is journaled in the side frames 4 and has keyed to it or otherwise connected the lever $71^a$, to the outer end of which is pivoted at $p$ the connecting-rod 73, having a screw-and-nut coupling at $q$, and pivoted at its lower end, at $r$, to the saddle-guide 74, which is slotted to work over the cam-shaft 13. This saddle-guide has at its under side a rod extending down through a hole in base 1, which rod serves to support a spiral spring $74^a$, which bears up against the saddle to raise it and hold its roller $s$ against cam F. The spring also raises rod 73, thereby tilting levers 71 backward and drawing back the forwarding and retaining device. The cross-slide, composed of parts 75 and $75^a$, is guided and supported in guideways secured to the side frame. The vertical portion 75 works in the guideways. The horizontal portion $75^a$ forms a cross-head, and is provided with a horizontal slot 81 for receiving the rollers of the jim-crank $69^b$ of the bar 69 of the forwarding and retaining device. The vertical bar 75 rests at its lower end upon lever 76, which is pivoted at $u$ to the end of rock-shaft 72, and has pivoted to its other end, at $t$, the connecting-rod 77, which at its lower end is pivoted at $v$ to cam-lever 78, which is pivoted at $w$ to standard 79, and has a roller $x$, bearing against cam G.

The operation of cross-slide 75 $75^a$ actuates the jim-crank of the forwarding and retaining device, thereby raising and lowering the blade of the bar 69 as it is moved forward and back by levers 71, so as to move back over one windrow of stock and then down upon the apron and move the windrow forward to the gripper-jaws, which, with their operating mechanism, will be next described.

The gripper-jaws, which next act upon the stock, and their operating mechanism are illustrated in Figs. 18, 19, and 20, and the locking devices for the gripper-jaws are illustrated in Fig. 21. The gripper-jaws are also illustrated in the detail views, Figs. $18^a$ to $18^e$. The rear gripper-jaw 82 and front gripper-jaw 83 are suitably supported in the side frame above the receiving-channel 27 and adjacent to the belt-roll 24. The rear gripper-jaw 82 has an arm $82^a$, to which is pivoted at $y$ the connecting-rod 86, which at its lower end is pivoted at $z$ to saddle-guide 87, having a slot working over cam-shaft 13, and having a roller $a'$ bearing on cam H. A spiral spring is attached to the lower end of saddle-guide 87 and to the base for drawing such guide and its roller down upon the cam. The jaw 82 has a guide $82^b$ at its upper portion. The front gripper-jaw 83 has hub 84 and a lever-arm provided with a pin $84^a$, to which in practice is attached a spiral spring for opening the jaw. Bearing-pins 85 pass through bosses in the side frame for supporting the hubs of both gripper-jaws. A collar 88, Figs. $19^a$ and $19^b$, is fitted on the hub of the frame, and has a short lever-arm $88^a$ provided with a lateral lug $c'$ for contact with lever-arm projecting from hub 84 of gripper-jaw 83 and is pivoted at $b'$ to the connecting-rod 89, which at its lower end is pivoted at $c''$ to cam-lever 90, which is pivoted at $d'$ to standard 15, and is provided at its free end with a roller $e'$, bearing on cam I, Figs. 18 and 19. The latch-pieces 91 of the locking device have lateral lug $91^a$, through which pass pivot-pins pivoting latch-pieces to gripper-jaw 82. Said lugs $91^a$ have projecting seats for the ends of the spiral springs 93, placed in sockets or recesses in the bosses $82^b$ of gripper-jaw 82. The lateral lugs $91^a$ on the latch-pieces 91 also act as one of the sets of clamping-pieces for clamping the gripper-jaws together. The outer ends of latch-pieces 91 are provided with catches $91^c$ for embracing and locking the gripper-jaws when they are together. The other ends or heels $91^b$ of the latch-pieces are perforated, and the right-hand one is connected by a ball-joint with rod 92, which has secured upon its front end a button $92^a$ for the forked lever 94 to act upon.

Lever 94 is shown in Figs. 8, 18, and 19, and is provided with a sharp-forked upper end $94^a$, turned at right angles to its shaft for moving forward between the heel $91^b$ and button $92^a$ in the operation of unlocking or releasing the latch-pieces from the gripper-jaws and permitting-jaw 83 to be pulled back by a spiral spring. Lever 94 is pivoted at $f'$ to the side frame, and has at its lower end a roller $g'$, bearing on the cam-face $j$, Fig. 8, of cam J. When the locking-lever arm $88^a$ is raised by its cam-lever 90 and connecting-rod 89, it carries forward gripper-jaw 83, which is thus made to bear upon the beveled ends or catches $91^c$ of latch-pieces 91, thus opening such latches against the action of the spiral springs 93 till the catches are made to embrace the jaws and lock them together, as shown in Fig. 18 and the detail views, Figs. $18^c$ $18^d$ and $18^e$, in which it will be seen that the compressing and forming tongue works between the jaws.

The compressing, forming, and delivering tongue 95 and its operating mechanism are illustrated in Figs. 22, 23, 24, 29, 30, and 31. The tongue 95 is given two principal motions —an up-and-down reciprocating motion between the gripper-jaws and a longitudinal reciprocating motion with the receiving-channel. The up-and-down motion serves to compress the tobacco into a rod to clean the gripper-jaws and force or deliver the rod of tobacco-stock down into the receiving-channel 27. The longitudinal motion is applied and the tongue carried forward simultaneously, with the receiving-channel at the same time that such tongue is being forced between the grippers down into the receiving-channel. The tongue 95 is provided at the ends with slide-pieces $95^a$, Fig. 29, which slide in the guideways $82^b$ of gripper-jaw 82, Fig. 19. It is also provided at the top with a rod $95^b$, to which the levers 96 are attached, Fig. 22, and has a lateral pin $95^c$, with which the forked reciprocating lever 102 loosely connects, Fig. 24, the pin simply working in the slot of the lever. The tongue-levers 96 have slots in their ends, as shown in Fig. 22, and in such slots are arranged half-boxes working on rod $95^b$, and said levers are keyed to rock-shaft 97, which is journaled in the side frames. The lever 98 is also keyed to rock-shaft 97, and is pivotally connected at $h'$ to connecting-rod 99, which at its lower end is pivoted at $i'$ to the cam-lever 100, which is pivoted at its outer end $l'$ to standard 101 and has on its free inner end a roller $k'$, working in a cam-groove $j'$ of cam J. The lever 102, for giving longitudinal reciprocating motion to the tongue, has a forked upper end, which embraces pin $95^c$ on the tongue, as above mentioned, and is pivoted at $m'$ to hanger 103, and is provided at its lower end with a roller $n'$, working in cam-groove $j''$ of cam J. The reciprocating lever 104, for giving longitudinal reciprocating motion to receiving-channel 27, engages at the top with pin $27^b$ of the slide $27^a$, secured to the receiving-channel. It is pivoted below at $o'$ to hanger 103 and is connected by link 105, pivoted to it at $p'$, to lever 102 at pivot $q'$. The lever 104 thus receives its motion from lever 102 and moves synchronously therewith, so as to move the receiving-channel at the same time and to the same extent that the tongue is moved. This provides for a positive motion forward of the tongue while in contact with the tobacco-rod in the receiving-channel until such tongue is raised out of the channel.

The mechanism for moving the feed-apron 23 over its rollers and supporting-plate is illustrated in Figs. 13, 14, and 15. The inner roll 24 is mounted on shaft $24^a$, which has on its rear end the loose segmental gear $24^b$, which meshes in the rack-bar 107, and connects by a spring-pawl $106^a$ with the ratchet wheel 106, which is keyed on shaft $24^a$. The rack-bar 107, meshing with the segmental gear, as above stated, is arranged in a guideway and is pivotally connected at $r'$ to connecting-rod 108, which at its lower end is pivoted at $s'$ to cam-lever 109, which is adjustably pivoted at $t'$ in slotted standard 79 and provided at its end with roller $u'$, bearing on cam K. This mechanism gives an intermittent motion to the feed-apron for carrying the stock forward to the receiving-channel. The receiving-channel 27 is supported by the bridge-pieces 110 upon the bed-plate, Figs. 29, 30, and 31. The folding-channel 128 is also supported by bridge-pieces upon the bed-plate 3, as shown in Fig. 9. The receiving-channel, as above described, is located below the gripper-jaws and their compressing-tongue, and the folding-channel is located in line therewith and extends toward the rear end of the machine, as seen in Figs. 6 and 7. The paper-ribbon reel 111 is mounted by its journals in the slots $5^a$ of standards 5, (seen in Figs. 22 and 23,) and the roll of paper rests on guide-roller 112, which is suitably supported above bed-plate 3, Fig. 6. This guide-roller has side flanges and is stationary, so that the paper ribbon is always fed off at the same height, while the reel of paper as it is reduced in size is free to move down in the slots $5^a$ and always rests upon the guide-roller 112.

The mechanism for shaping the paper ribbon and feeding it through the receiving and folding channels is illustrated in Figs. 6, 7, 25, 26, 27, and 28. At the front end of the machine just beyond the paper-reel is located the former-frame 113, to which is pivoted the adjustable brackets 114, which are slotted and secured in position upon the frame by set-screws and carry the tension-roller 116. The top roller is journaled in the side frames. By adjusting the side brackets any desired tension can be brought on the paper ribbon by roller 116. The former 117 is of tapering form from front to rear, and has a convex under surface of increasing convexity from its wide front end to its narrow rear end, and is for the purpose of properly forming and folding the paper ribbon and filler-carrying tape. The former should be raised to permit the ready introduction of the paper to the channel in starting. It therefore is pivoted at $w'$ to bridge-piece 118, which is secured to the former-frame 113. A screw $x'$ works through bridge-piece 118 for adjusting the former up and down, and a flat spring $y'$, Fig. 26, engages in a hook at the outer end of the former for suitably supporting it. The former is preferable made hollow or with a groove in its upper portion to make it lighter. The return tape-roller 119 is journaled in suitable side frames within the former-frame and serves for guiding the tape. The filler-carrying tape 120, after passing through the receiving and folding channels, passes over the unfolding-roller $z'$, as shown in Figs. 3, 4, 6, and 7; thence around the drum 121, and between such drum and the rubber rolls 122, which are supported by their spindles in side brackets having adjustable boxes and screws for forcing them against the drum and tape, Fig. 3, thereby assisting in pulling the tape through the receiving and folding channels. It will be understood that the rubber rollers receive motion from the drum. After leaving the drum 121 the tape passes over tightening-roller $z''$ and returns to roller 119, above mentioned. The drum 121 is rotated through the medium of spur-wheel 124, keyed to the same shaft as the drum, and pinion 125, meshing with such spur-wheel and keyed to the sleeve-shaft, which is applied to shaft 21. The driving-gear 20 is fixed by its hub $20^a$, Fig. 9, on the outer end of the sleeve-shaft and meshes with beveled gear 19 on inclined shaft 16. The sleeve-shaft is hid behind other parts, but incloses and works around the transverse shaft 21. It also turns with such shaft when clutch 126 is moved in to engage the teeth of hub $20^a$. The clutch is operated by a pivoted shifting-lever $126^a$, the handle of which extends to the rear end of the machine for convenience of the operator.

The receiving-channel 27, through which both the filler-carrying tape and the paper ribbon forming the wrapper travel, is shown in cross-section on enlarged scale in Fig. 28, in which the channel is connected to its slide-piece $27^a$. The side walls of the channel have their upper edges $m''$ projecting inward to form a recess for the tape 120. The hooked shields N N′ have at their tops the turned-down inner flanges $n''$, and are secured by screws to the channel. The shields and their flanges extend through the length of the channel and serve to protect the paper ribbon and tape from injury by the compressing-tongue. The shield-piece N′ has at the top an inclined bridge-plate $h''$, extending to the feed-apron, passing over roll 24, as shown in Figs. 18 and $18^c$. The paper ribbon is wider than the tape and extends above it on each side in the channel, so that the tobacco cannot get onto the tape and stain the outside of the paper, and so that the edges of the paper ribbon may be folded over, pasted, and wrapped around the cigarette-rod without interfering with the tape. The tape and paper ribbon, after leaving the receiving-channel with the contained tobacco-rod, pass into the folding-channel 128 set in the bed-piece 127, Figs. $7^a$, $7^b$, $7^c$, and $7^d$. The folding-channel 128 is made in two longitudinal sections formed at the bottom with interlocking projections, as shown in Fig. $7^a$, and such sections are adjustable to or from each other by adjusting-screws 129. The paper ribbon is folded over the cigarette-rod by the beveled folding-wheels mounted by their arbors in brackets on the bed-piece 127. The first beveled inclined roller 130 operates to turn down the right-hand edge of the paper ribbon, while the second roller 131 stands vertically between the left-hand vertical edge of the paper and the tobacco-rod, serving to roll down the fibers of the tobacco if at any time they should swell or spring out beyond the limits to which the rod was condensed, and also to complete the turning down of the right-hand edge of paper as it passes from roller 130. The cigarette rod and wrapper pass next under the curved or concave lip of plate 134, Fig. 7[c], which is adjustable up and down by screw 134[a]. That portion of the screw 134[a] which passes through the bed-plate 127 and the recess therein is plain, and that portion in the recess has coiled about it a spiral spring, which presses upward against the plate 134, thus slightly raising it off from the channel 128 when the screw is sufficiently slackened. It is evident that with this construction the plate 134 is yieldingly supported and can be adjusted toward or away from channel 128. By means of this adjustable plate 134 and the two adjustable longitudinal sections of the folding-channel 128 cigarette-rods of varying sizes may be passed through the channel and be therein wrapped with the paper ribbon. The plate is slightly lower than the opposite side of the channel, so that the standing edge of the paper is supported by the vertical wall as paste is applied to it by the paste-wheel 137. Any suitable device—such as a flat coiled spring or a small roller (not here shown)—may be arranged to bear against the back of the standing edge of paper ribbon and press it against the paste-wheel. The third inclined beveled roller 132 holds the right-hand edge of paper down beyond the paste-wheel, and the fourth beveled roller 133 folds over the pasted edge of the paper ribbon (now forming the wrapper) and laps it upon the other turned-down edge. The wrapped cigarette passes next between the upper and lower pairs of guiding-rollers 135 and 136, Fig. 3, which complete the operation of pressing the pasted edges together. The horizontal paste-wheel 137, Figs. 4 and 9, is preferably made of hard rubber and is secured to the top end of vertical shaft 138, having at the bottom a beveled gear 139, supported by a hanger or bracket and meshing with the beveled gear 140, keyed on shaft 141, supported in a hanger and having a sliding clutch 142, operated by lever 142[a]. A sprocket-wheel 143, having a toothed hub, is mounted on shaft 141, and is turned by sprocket-chain 143[a], working over a sprocket-wheel 143[b], which is keyed on the sleeve-shaft on shaft 21 for giving motion to the paste-wheel. As shown in Fig. 7[c], the paste-wheel revolves close above the adjustable plate 134 and its edge applies paste to the standing edge of the paper wrapper, which is supported by the vertical wall of the channel and the flat coil-spring, above described. The vertical shaft 138 is supported at its lower end in the hanger 138[a], and is adjustable up and down by means of screw $p''$, so that the wheel may be made to bear at exactly the right height upon the edge of the paper ribbon. The beveled gear 134 is connected to the shaft by a spline-joint, which permits the desired vertical movement of the shaft. The head or cap 144 of the paste-cylinder has a projecting lip or flange, and the top of the can has a similar lip or flange. A sufficient space is left between these lips for the passage of the edge of the paste-wheel 137, to receive paste from the can. In practice I have found that the projecting lips may be omitted and the edge of the wheel project a short distance into the paste-cylinder. A doctor for removing superfluous paste from the wheel is secured to the head of the cylinder. The paste-cylinder 145 is secured to the bed-plate 3, and is provided with a piston 145[a], to which connects rod 146, passing down through the lower head of the cylinder and resting at its lower end on the top end of a rack-bar 147, Figs. 1, 8, and 9, which slides in a bracket-support 148. A toothed pinion 149 is pivoted to the bracket and has a spring and pawl which are secured to the forked lever 150, and this lever is pivoted to the pin or axle of the toothed pinion and has notches for an adjustable weight 151. The weight is moved to or from the paste-cylinder, according to the pressure desired on the piston. These devices serve to gradually force the piston up for feeding the paste to the paste-wheel. On top of the cap 144, I place a pressure-plate 145[a], having around its edge downwardly-extending lugs $u''$ for evenly distributing the pressure upon all portions of the cap, so that it will not spring at any point and permit leakage. A yoke 146[a] is pivotally connected on each side of the cylinder near its top, and is provided at its middle portion with a clamping-screw for bearing on plate 145[d], thereby holding cap 144 in place.

The wrapped cigarette-rod passes from the carrier-tape through a tubular holder in the cutter frame or carriage, Figs. 4, 5[a], and 5[b], where it is cut into lengths for cigarettes, as described below.

The cutter and its operating mechanism are illustrated in Figs. 3, 4, and 5. The cutter frame or carriage is moved forward with the cigarette-rod during each stroke of the cutter-blade—that is, as each cigarette is cut off—so that there shall not be any cramping or back-pressure on the cigarette-rod by the passage of the cutter-blade. Consequently the wrapper is not broken or spread apart at the pasted seam by the action of the cutter. The cutter-head 152 has secured to its face the eccentric cutter-blade 154 by means of the clamping-plate 155 and nut 156, and is mounted on the reciprocating shaft 153, which is journaled at $a''$ in bracket 153[a], and also passes through and engages by means of a spline-joint with the hub of the sprocket-wheel 157, so as to slide or reciprocate longitudinally therein. The sprocket or gear wheel 157 is provided with a hub, which is journaled at $b''$ in a bracket-support, and engages with a shaft 153 by a spline-joint or feather, as above described. A second sprocket-wheel 159 is keyed to the driving-shaft 160, Fig. 3, which is journaled at $c''$ and $c'''$ in suitable hangers and has on its forward end the beveled gear-wheel 161, which meshes with the beveled gear-wheel 22 on transverse driving-shaft 21. The sprocket-wheels are connected by chain 158 for revolving the cutter-head. Three spur gear-wheels meshing into each other may be substituted for the sprocket-wheels and chains. The reciprocating cutter frame or carriage 162 is provided on one side with the longitudinal tongue or rib 162[a], working in the guideway 164, secured to the bed-plate of the machine, and such carriage is connected on the other side to the reciprocating shaft 153. The carriage has set into it on one side near shaft 153 the cylindrical bearing 163, which is provided with a diametrical opening slightly elongated and of an elliptical shape crosswise, in which is inserted the round end of the oscillating lever 165 for giving reciprocating motion to the carriage and cutter-head. The lever 165 is pivoted at *d''*, Figs. 1 and 9, to stand-bracket 166, and is provided with a roller *e''*, bearing in cam-groove *l''* of cam L, (shown in Figs. 3 and 5,) which is secured to shaft 160. A soft-rubber piece 167 is secured to one side of the carriage at its outer end near the guideway 164 for the purpose of holding the cigarette-rod against the edge of the cutter-blade while being severed into lengths for cigarettes. The sharp edge of the blade may strike into the soft rubber without being injured. A tubular holder 168, Figs. 5, 5[a], and 5[b], having a slightly-conical opening for the cigarette-rod to pass through, but larger in diameter than said rod, as shown in Figs. 5[a] and 5[b], is secured by a set-screw in a boss of the cutter-frame. This tubular holder has sharp angular edges acting as a shear in connection with the cutter-blade, also as a scraper for the cutter-blade. A chute 169, for guiding the cigarettes as they are cut off, is mounted on a swinging arm pivoted at *f''*, so that it may be thrown back when it is desired to adjust the cutter. The forked belt-shifter 170 (shown in Fig. 8) is connected to a sliding rod 171, which works in guideways, and is pivotally connected at *g''* to the link 172, which is pivotally connected at *h''* to the short lever 173, secured to rock-shaft 176, which shaft is operated by lever-handle 177, Fig. 9, such handle being held in the desired position in the notched bar 178. A brake-lever 174 extends downward from rock-shaft 176 and makes connection with a brake-shoe 175, Figs. 1 and 2, pivoted at *i''* to the base 1. This brake-shoe when in use is made to bear upon fly-wheel 10 for stopping the machine at the same time the belt is shifted onto the loose pulley 9.

Having described the construction and arrangement of parts of the machine, the operation can be understood from the following description: The tobacco-stock is spread by hand in a suitable layer upon the feed-apron, and can be readily manipulated by one attendant. When the machine is started and the feed-apron moves forward with a layer of stock, supposing the parting-bars and their blades to be elevated, their first movement is to drop down with their lower edges upon the layer of stock; second, the bar 28 and its blade are moved forward on the apron by cam B and its connections; third, both blades are raised by the T-slide 43, cam C, and their connections; fourth, the blades are brought together by the operation of cams A and B, and at the same time dropped upon the apron a little in advance of the place where they first rested by cam C; fifth, both blades part, one from the other, and scrape the apron, and then the parting and scraping movements are repeated in the above order to completely form a windrow of stock. Every time the parting-blades move apart they are scraped clean of adhering stock by the scraper 51 and device 57, which are caused to move down over their faces beyond their lower edges by means of cam D and their connections. The parting movements are effected by one rotation of cams A and B. After the parting movements of the blades have taken place the feed-apron begins to move forward, and then the device 57 is moved forward by cam E and its connections, causing the shoes 64 to drop off from the scraper-connections, (pins 52[b], extending from the projecting arms 52[a] of levers 52,) and then such device 57 shoves forward the loose roll or windrow of stock on the apron to a position where it is next acted upon by the forwarding and retaining device. During the forward motion of device 57 it is given a vibrating longitudinal motion by means of the inward and outward curves at the edges of the side plates 25[a], secured to the supporting-plate 25, for evenly distributing the stock, if any should extend to too great a height above the supporting-bed. It will be remembered that the projecting lip of the device 57 is toothed or serrated to assist in distributing or leveling the upper face of the stock. The device 57 is next drawn back over the trap-guides 66 and 65, thus raising the shoe upon pins 52[b], so that the device may again receive motion to act as a scraper for one of the blades of the parting-bars. As soon as the device 57 is drawn back the forwarding and retaining device, now in a raised position, is caused by cam G and its connections to drop down behind the loose roll of stock, and then by means of cam F and its connections to move such roll slightly forward and in between the gripper-jaws, which are now brought together by means of cam I, thus compressing the stock flat between them, the jaws at the same time being locked together by the locking-latches and their connections. While the jaws are locked together and their lower edges down upon the blade of the forwarding and retaining device at the apron over feed roller 24, the compressing and forming tongue 95 is forced down between the gripper-jaws by means of cam-groove *j'* in cam J and the connecting-rod and levers, thereby compressing the stock into a compact rod. The tongue is now slightly raised, the gripper-jaws are moved forward by cam H to receiving-channel 27, and the tongue is now forced downward, so as to deliver the tobacco-rod directly into the partly-folded paper ribbon in the receiving-channel and give it sufficient pressure at the lapping end to form, with that portion which has passed forward in the channel, a continuous cigarette-rod. The peculiar shape and arrangement of the former 117, Fig. 7, in relation to the receiving-channel and the paper ribbon as it is fed off from the reel and passes below the adjusting-roller 116, Fig. 6, causes the paper ribbon to be evenly and neatly folded up in the U-shaped form shown in the receiving-channel, Fig. 28. It travels through the receiving-channel with its edges under the hooks or turned-down flanges $n''$ of the guides N N′, and the ribbon is maintained in such shape with the tobacco-rod resting in it throughout the length of the receiving-channel, and until it is acted upon by the beveled folding-rollers above the folding-channel. The tape 120 is also folded into a U shape by the former and travels through the receiving-channel below the paper ribbon, so as to protect it and to assist in carrying it forward. This arrangement of the filler-carrying tape and ribbon, with mechanism for drawing them together through the receiving-channel and the folding-channel from the front of the machine to the rear end thereof and up to the cutter-blade, is much simpler and more effective than the arrangement and mechanism heretofore employed for such purpose. After leaving the receiving-channel the paper ribbon is folded over first at one edge, while the other edge is pasted, and then the pasted edge is folded over to form a complete wrapper for the filler-rod, as heretofore described with reference to the folding-channel and its beveled rollers. All the operations of the different parts of the machine are intermittent and are so timed that each operation succeeds the other without interference or interruption, the cigarette rod or filler being conducted through the receiving and folding channels in just the right time for a fresh section of the rod which is being delivered by the tongue into the receiving-channel to be lapped at its forward end upon the rear end of the rod which has just passed out of the receiving-channel. A continuous filler-rod is thus made and is continuously wrapped by the paper ribbon. As the wrapped and completed rod passes forward through the tubular holder 168 in the cutter-carriage, it is cut into cigarette-lengths by the rotating cutter-blade heretofore described.

Having thus described my invention, what I claim, and desire to secure by Letters Patent, is—

1. In a cigarette-machine, the combination, with an intermittingly-moving feed-apron, of the parting-bars operating thereon and their operating mechanism, the pivoted gripper-jaws and their tongue, and means for forwarding the stock from the parting-bars to such gripper-jaws, as described.

2. In combination with an intermittingly-moving feed-apron, the parting-bars operating thereon and their operating mechanism, the pivoted gripper-jaws and their tongue, means for forwarding the stock from the parting-bars to such gripper-jaws, and the receiving-channel located below the gripper-jaws, as and for the purpose described.

3. In a cigarette-machine, the combination, with an intermittingly-moving feed-apron, of the parting-bars operating thereon and their operating mechanism, a forwarding and retaining device, means for forwarding the stock from the parting-bars to the forwarding and retaining device, the pivoted gripper-jaws, and their tongue, as described.

4. In a cigarette-machine, the combination, with an intermittingly-moving feed-apron, of the parting-bars operating thereon and their operating mechanism, a forwarding and retaining device, means for forwarding the stock from the parting-bars to the forwarding and retaining device, the pivoted gripper-jaws and their tongue, and suitable cleaners or scrapers for cleaning the parting-bars and operating mechanism for such scrapers, as described.

5. The combination, with the intermittingly-moving feed-apron, of the reciprocating forwarding and retaining device, the pivoted gripper-jaws and their tongue, such jaws and tongue operating in connection with the forwarding and retaining device, and the reciprocating receiving-channel.

6. The combination, with the intermittingly-moving feed-apron and mechanism for parting the stock into windrows thereon and forwarding the same, of the pivoted gripper-jaws and their tongue and the reciprocating receiving-channel.

7. In combination with the feed-apron and the parting-bars, the device 57, having a serrated upper edge, and means for giving it a longitudinal vibrating motion and pushing it forward and back for the purpose of distributing and leveling the stock in a windrow as it is pushed forward, as described.

8. In a cigarette-machine, the forwarding device 57, having curved connecting-rods 58, provided with downwardly-extending shoes and side pins, in combination with the mechanism for moving it forward and back, and the trap-guide, for the purpose specified.

9. The combination, with the forwarding device 57, having curved connecting-rods, shoes, and side pins, as described, of the trap-guides 65 and 66 on each side of the feed-table, as described.

10. In combination with the feed-apron, the reciprocating forwarding and retaining device, and mechanism for raising it above a row of stock and then lowering it upon the apron behind such row of stock and carrying it forward thereon, and the pivoted gripper-jaws and their tongue acting in connection with such device, for the purpose described.

11. In combination with the feed-apron and mechanism for causing it to intermittingly travel forward, means for parting a layer of stock on such apron into rows, means for moving the separate rows forward, the pivoted gripper-jaws and their tongue, and the forwarding and retaining device for retaining and supporting each row of stock while it is being compressed into a rod, as described.

12. In combination with the intermittingly-moving feed-apron and means for separating the stock into rows thereon, means for moving the separate rows forward, the forwarding and retaining device and its operating mechanism, and the pivoted gripper-jaws and their tongue operating in connection with such forwarding and retaining device for compressing the rows of stock, as described.

13. In combination with the intermittingly-moving feed-apron for carrying forward a loose row of stock, a reciprocating forwarding and retaining device, the separately-pivoted gripper-jaws and their tongue, and mechanism for opening and closing the jaws for compressing the stock, as described.

14. In a cigarette-machine, the swinging gripper-jaws mounted at their ends by means of pivotal pins in suitable supports and pivotally connected one to the other, in combination with mechanism for opening and closing the jaws, the forwarding and retaining device operating beneath one of the jaws, an intermittingly-moving feed-apron, and a reciprocating receiving-channel, as described.

15. In combination with the separately-pivoted gripper-jaws and mechanism for operating and closing them, the pivoted latch-pieces 91 and their operating mechanism for locking the jaws together while the stock is being compressed and for releasing them, and a suitable support for the stock.

16. In combination with the separately-pivoted gripper-jaws and mechanism for closing and turning them, thereby compressing the stock in one direction, a compressing and forming tongue arranged between such jaws, and mechanism for operating it for compressing the stock in the other direction to form a rod and for delivering such rod to the receiving-channel, and a suitable support for the stock while being compressed, as described.

17. The separately-pivoted gripper-jaws mounted on pivotal pins, as described, one of such jaws having guideways at its ends, in combination with a compressing and forming tongue having sliding portions at its ends working in the guideways of the jaw, mechanism for reciprocating the tongue up and down between the jaws, means for operating one jaw toward the other and for turning both jaws, and suitable means for supporting the stock or rod, as and for the purpose described.

18. The combination of the pivoted gripper-jaws and their operating mechanism, the compressing and forming tongue between the jaws and its operating mechanism, and a suitable support for the stock while being compressed, with the reciprocating receiving-channel placed below the jaws and tongue for receiving the compressed rod or stock.

19. In combination with the vertically-operating compressing and forming tongue and the longitudinally-reciprocating receiving-channel and mechanism for simultaneously giving longitudinal reciprocating motion to the tongue and channel while such tongue is within the channel, as and for the purpose described.

20. The combination of the receiving-channel 27, having inwardly-projecting upper edges $m''$, for the purpose described, with the hooked shields N N′, composed of guides located along the outside of the channel, and having inwardly-turned flanges projecting down into the channel, and means for securing the guides to the channel, as and for the purpose described.

21. In a cigarette-machine, a former for partially folding the paper ribbon and carrier-tape having a tapering form from front to rear, and having its under side slightly convex at the broad front end and of increasing convexity to the rear small end and pivotally mounted in a frame at the front end of the receiving-channel, in combination with the filler-carrier tape arranged to pass below such former, substantially as described.

22. In combination with the reciprocating receiving-channel, the tapering former pivotally mounted in a frame and means for adjusting it, as described, 23. In combination with the former 117, pivotally mounted in a frame, a supporting-spring engaging with it, and an adjusting-screw arranged to bear upon it, substantially as and for the purpose described.

24. In combination with the pivoted former 117, a tension-roller 116 for the paper ribbon mounted in a bracket in the frame of the former, means for adjusting the bracket and former, and the reciprocating receiving-channel, as set forth.

25. In combination with the receiving-channel, the paper-guide roller 112, a suitable tension device, the filler-carrying tape, and the pivoted and loosely-mounted former, whereby the paper ribbon and tape are both partly folded and passed through the channel together.

26. The combination of the folding-channel 128, consisting of longitudinal sections, a bed-piece 127 for holding such sections, and means in the bed-piece for adjusting the sections to or from each other, for the purpose described.

27. In combination with the folding-channel 128, consisting of two sections adjustably supported in a bed-piece, an adjustable plate 134, arranged as described and shown, and having its inner edge or lip curved or concaved, and arranged slightly lower than the opposite side of the channel to provide for the passage of the paste-wheel against the standing edge of the paper wrapper, and means for conveying the rod forward.

28. The combination, with the folding-channel 128, consisting of the two parts which are adjustable one in relation to the other, the top plate 134, having a concaved lip yieldingly supported on one side below the top of the channel, the paste-wheel working above such plate, and means for conveying the rod forward.

29. In combination with a folding-channel, a first inclined beveled roller operating therein on one side near the front end of the channel for turning down one edge of the paper, and the following vertically-arranged beveled roller working in the opposite side of said channel inside of the standing edge of the paper for rolling down fibers of tobacco before such standing edge of the paper is pasted, and means for carrying the rod forward.

30. In combination with a folding-channel, the yieldingly-supported top plate, and a paste-wheel, the two inclined beveled rollers 132 and 133, located beyond the top plate and paste-wheel for folding over the pasted edge of the paper and sealing the wrapper, and means for conveying the rod forward.

31. In combination with a folding-channel, its beveled rollers 130, 131, 132, and 133, arranged as described, the upper and lower rollers 135 and 136, the yielding plate 134, a paste-wheel 137, and means for conveying the tobacco-rod forward.

32. In combination with a reciprocating receiving-channel and a compressing-tongue working therein, a folding-channel provided with the rollers arranged as described, a pasting device, and a filler and wrapper carrying tape arranged in the channels, as and for the purpose described.

33. In combination with a reciprocating receiving-channel, a compressing and forming tongue reciprocating with such channel and vertically operating therein, means for supplying tobacco in rod form of suitable lengths to the receiving-channel, a stationary folding-channel provided with rollers operating to turn over the edges of the paper wrapper therein, a pasting device, and the traveling tape arranged in the channels, as and for the purpose described.

34. The combination of a reciprocating receiving-channel 27, having inwardly-projecting upper edges $m''$ to form a recess for the traveling tape, flanges $n''$, projecting down into the channel to protect the edges of the paper ribbon, a compressing and forming tongue reciprocating with such channel, means for supplying tobacco-stock in rod form of suitable lengths to the receiving-channel, a stationary folding-channel provided with rollers operating to turn over the edges of the paper wrapper therein, a pasting device, and the traveling tape arrranged in the channels, as and for the purpose described.

35. In combination with a reciprocating receiving-channel and a compressing-tongue working therein, a folding-channel composed of adjustable longitudinal sections suitably supported and provided with folding-rollers, operating as described, a pasting device, and the filler and wrapper carrying tape arranged in the channels, as and for the purpose described.

36. In combination with a reciprocating receiving-channel and a reciprocating compressing-tongue working therein, a stationary folding-channel provided with rollers operating to turn over the edges of the paper wrapper therein, a pasting device, the traveling tape arranged in the channels, and a reciprocating cutter-frame carrying a revolving cutter, substantially as described.

37. The combination of a folding-channel consisting of two adjustable sections, a yieldingly-supported top plate therefor, a pasting device, folding-rollers working in the channel, and a traveling tape with a reciprocating cutter-frame and a rotary cutter, substantially as described.

38. The paste-cylinder having a narrow opening in its head for the passage of the paste-wheel and having a piston working in it, and a downwardly-extending piston-rod, in combination with a notched pivoted lever and an adjustable weight for forcing the rod and piston upward in accordance with the varying pressure required to feed the paste in proper quantity to the paste-wheel, as described.

39. In combination with the piston-rod of the paste-cylinder and the cylinder having a narrow opening in its head, a separate rack-bar sliding in a bracket-support, a notched pivoted lever provided with a toothed pinion and spring-pawl also pivoted to such support, and an adjustable weight, substantially as and for the purpose described.

40. The reciprocating cutter-frame having on one side a tongue or rib sliding in a guide-way and supported on the other side by a reciprocating revolving shaft mounted in suitable bearings, and a tubular holder on the cutter-frame, in combination with a cutter-head and eccentric cutter-blade mounted on said shaft, a sprocket or gear wheel engaging with the shaft by means of a feather, and mechanism for revolving the shaft and giving it and the frame reciprocating motion, substantially as described.

41. The reciprocating cutter-frame supported as described, and having a holder for the cigarette-rod provided with sharp outer edges, and also a soft-rubber piece secured adjacent to the holder, in combination with a cutter-head mounted on a reciprocating and rotating shaft and having a cutter-blade clamped thereto with its curved edge eccentric to the head and shaft, and mechanism for operating the frame and cutter, substantially as described.

42. The combination of a feed-table, a receptacle for a continuous filler, a pair of gripper-jaws, means co-operating therewith to form a mold, and means for transferring successive portions of loose stock in rows from the table to the gripper-jaws and from the jaws to the receptacle, substantially as set forth.

43. In a cigarette-machine, the combination of the feed-table, a pair of gripper-jaws, means co-operating therewith to form a mold, a wrapping-ribbon traveling parallel thereto, and means for transferring successively portions of the stock in rows to the jaws and from the jaws to the ribbon, substantially as set forth.

44. The combination of a pair of gripper-jaws and means for transferring portions of the stock thereto, of a tongue arranged to move between the jaws, and a suitable support between which and the tongue and jaws the loose stock is compressed to form a rod, substantially as set forth.

45. The combination of a pair of gripper-jaws, a tongue, and a suitable support between which and the tongue and jaws the stock is compressed to form a rod, and a traveling wrapper-ribbon, and means for supporting the same in position to receive successive rods from the jaws, substantially as set forth.

46. The combination, with devices for receiving and compressing successive rows of material to form rods, of a traveling U-shaped strip and means for supporting and compressing together within said strip the overlapping ends of successive rods to form a continuous filler, substantially as set forth.

47. The combination of the separable jaws, a tongue, and suitable support, all co-operating to form a four-part mold for compressing the stock to form a rod, substantially as described.

48. The combination, with a four-part mold and means for supplying successive portions of loose stock thereto to be compressed into rods, of a traveling strip arranged to receive the compressed rods from the mold, substantially as set forth.

49. The combination, with the gripper-jaws and tongue, of a blade for forwarding and retaining the row of stock against the pressure of the tongue, all co-operating to form a four-part mold, substantially as set forth.

50. The combination, with devices for receiving and compressing successive rows of stock to form rods, of a traveling wrapper, and a receiving-channel for receiving the wrapper and said rods, and means for depositing the rods in succession upon the traveling wrapper in the channel, substantially as set forth.

51. The combination, with the devices for bending the paper-wrapper strip, the devices for compressing and feeding successive rods of stock to said bent strip, and the devices for bending over and sealing the edges of the strip, of a continuous traveling belt moving in contact with the paper from the receiving to the sealing devices, substantially as set forth.

52. The combination, with the devices for compressing successive portions of stock into rods, of devices for feeding and bending up a strip of paper to a U shape, and devices for delivering the rods in succession into said bent strip, and for then turning and securing the edges of said strip upon the compressed rod, substantially as described.

53. The combination, with the receiving-channel, of a tapering former adjustably mounted in respect to said channel, substantially as described.

In testimony whereof I have signed my name to this specification in the presence of two subscribing witnesses.

ROBT. HARDIE.

Witnesses:
CHARLES E. FOSTER,
H. C. ELLIOT.